United States Patent
Strauss et al.

(10) Patent No.: US 11,810,223 B2
(45) Date of Patent: **\*Nov. 7, 2023**

(54) CONTROLLING MULTI-GPU EXECUTION OF KERNELS BY KERNEL PORTION AND RESOURCE REGION BASED DEPENDENCIES

(71) Applicant: Sony Interactive Entertainment LLC, San Mateo, CA (US)

(72) Inventors: Florian A. Strauss, Los Angeles, CA (US); Mark Evan Cerny, Los Angeles, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,558

(22) Filed: Mar. 28, 2022

(65) Prior Publication Data

US 2022/0222768 A1 Jul. 14, 2022

Related U.S. Application Data

(63) Continuation of application No. 16/861,049, filed on Apr. 28, 2020, now Pat. No. 11,288,765.

(51) Int. Cl.
*G06T 1/20* (2006.01)
*G06F 9/48* (2006.01)
*G06T 1/60* (2006.01)
*G06T 15/00* (2011.01)

(52) U.S. Cl.
CPC .............. *G06T 1/20* (2013.01); *G06F 9/4881* (2013.01); *G06T 1/60* (2013.01); *G06T 15/005* (2013.01)

(58) Field of Classification Search
CPC ................................ G06T 1/20; G06T 15/005
See application file for complete search history.

(56) References Cited

U.S. PATENT DOCUMENTS

| 9,451,291 | B1* | 9/2016 | Bozinovic | H04N 19/91 |
| 10,475,152 | B1* | 11/2019 | Havlir | G06F 9/5027 |
| 2007/0030277 | A1* | 2/2007 | Prokopenko | G06T 1/20 345/506 |
| 2007/0195099 | A1* | 8/2007 | Diard | G06T 1/20 345/501 |
| 2012/0001905 | A1* | 1/2012 | Andonieh | G06T 1/20 345/419 |
| 2014/0198113 | A1* | 7/2014 | Janczak | G06T 15/005 345/522 |

(Continued)

*Primary Examiner* — Charles Tseng
(74) *Attorney, Agent, or Firm* — PENILLA IP, APC

(57) ABSTRACT

Methods for graphics processing are provided. One example method includes executing a plurality of kernels using a plurality of graphics processing units (GPUs), wherein responsibility for executing a corresponding kernel is divided into one or more portions each of which being assigned to a corresponding GPU. The method includes generating a plurality of dependency data at a first kernel as each of a first plurality of portions of the first kernel completes processing. The method includes checking dependency data from one or more portions of the first kernel prior to execution of a portion of a second kernel. The method includes delaying execution of the portion of the second kernel as long as the corresponding dependency data of the first kernel has not been met.

20 Claims, 20 Drawing Sheets

(56) References Cited

U.S. PATENT DOCUMENTS

| | | | |
|---|---|---|---|
| 2015/0095914 A1* | 4/2015 | Mei | G06F 9/3887 |
| | | | 718/102 |
| 2015/0348225 A1* | 12/2015 | Schreyer | G06T 1/20 |
| | | | 345/522 |
| 2018/0286115 A1* | 10/2018 | Surti | G06T 5/20 |
| 2019/0043159 A1* | 2/2019 | Levit-Gurevich | G06F 9/455 |
| 2020/0218539 A1* | 7/2020 | Valerio | G06F 13/28 |
| 2020/0293367 A1* | 9/2020 | Andrei | G06F 9/4881 |

\* cited by examiner

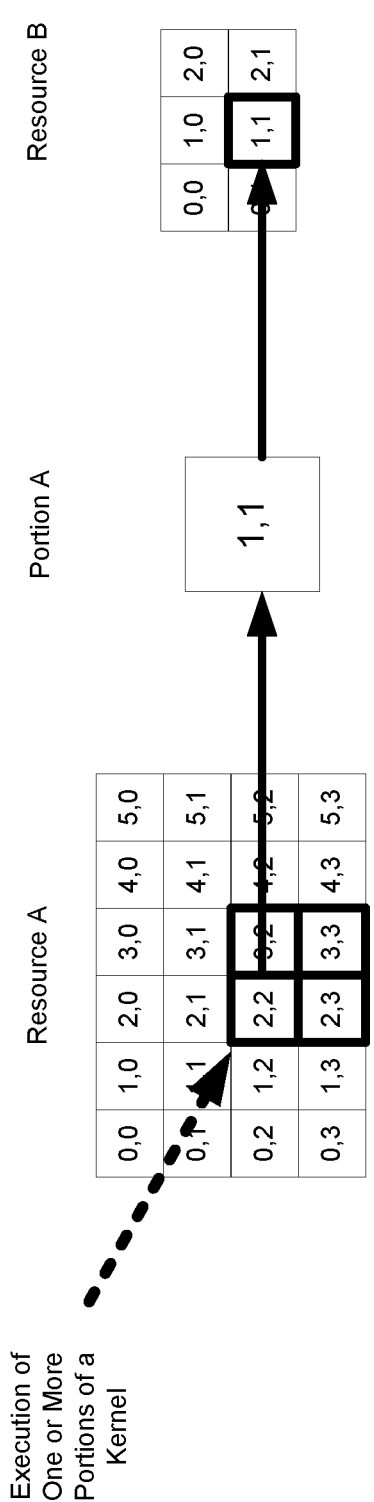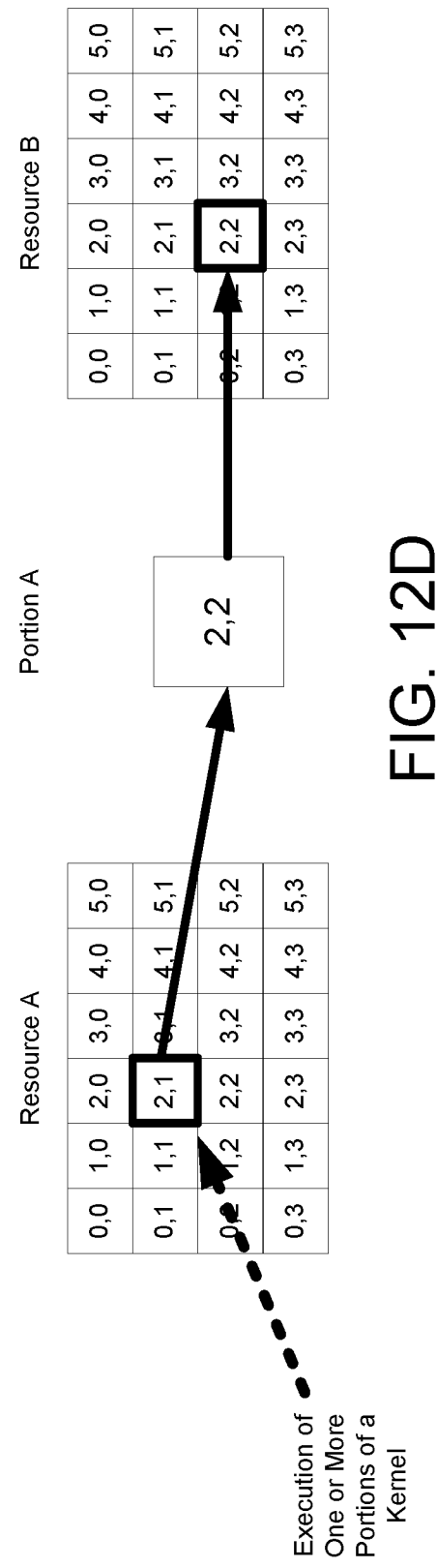
FIG. 12C
FIG. 12D

Resource A

| -1,1 | 0,0 | 1,0 | 2,0 | 3,0 | 4,0 | 5,0 |
|------|-----|-----|-----|-----|-----|-----|
|      | 0,1 | 1,1 | 2,1 | 3,1 | 4,1 | 5,1 |
|      | 0,2 | 1,2 | 2,2 | 3,2 | 4,2 | 5,2 |
|      | 0,3 | 1,3 | 2,3 | 3,3 | 4,3 | 5,3 |

FIG. 13C

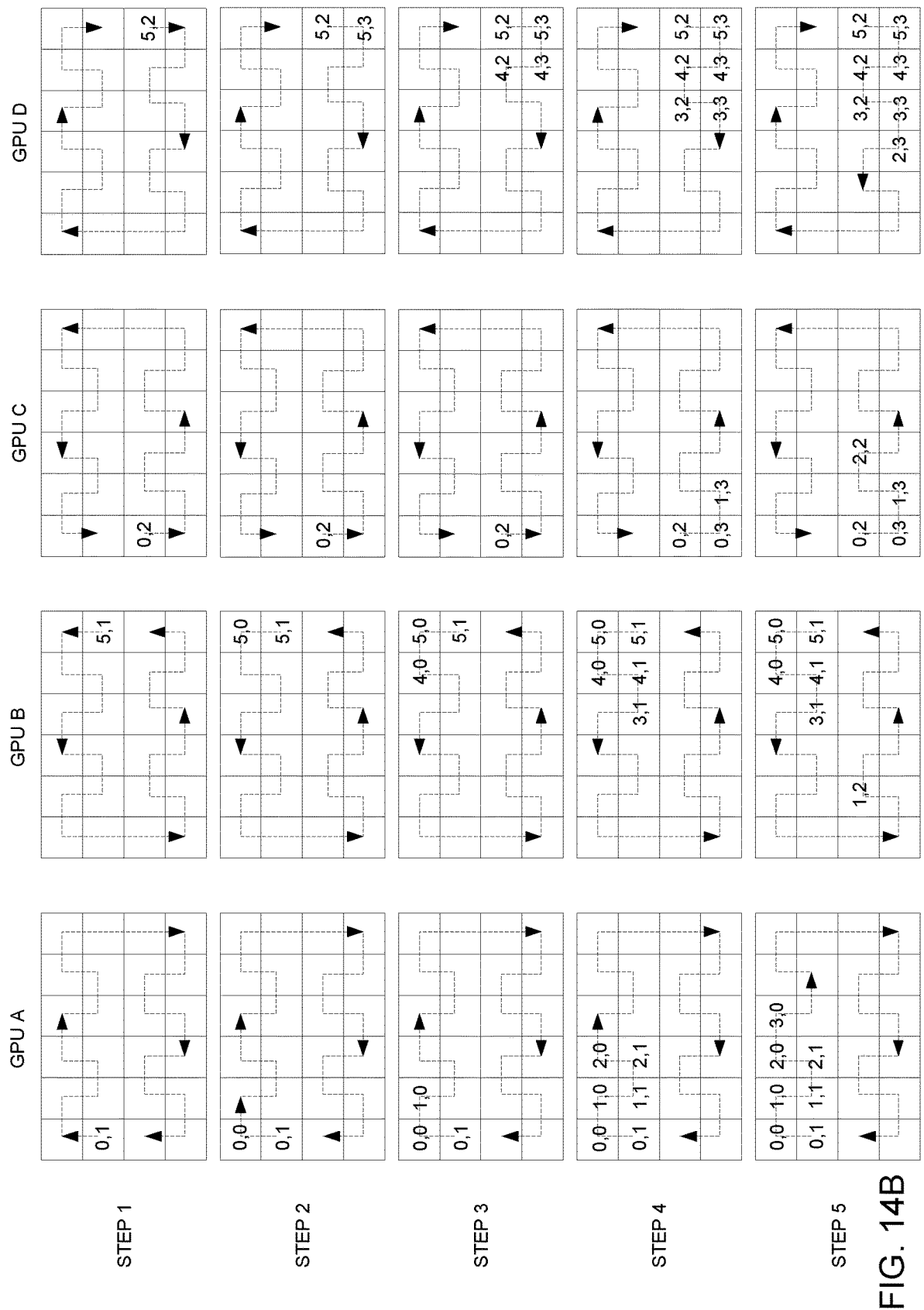

CONTROLLING MULTI-GPU EXECUTION OF KERNELS BY KERNEL PORTION AND RESOURCE REGION BASED DEPENDENCIES

CLAIM OF PRIORITY

This application is a continuation of and claims priority to and the benefit of commonly owned, patent application U.S. Ser. No. 16/861,049, filed on Apr. 28, 2020, entitled "System And Method For Efficient Multi-GPU Execution Of Kernels By Regions Based Dependencies," the disclosure of which is incorporated herein in its entirety for all purposes.

TECHNICAL FIELD

The present disclosure is related to graphic processing, and more specifically for kernel computation on graphics processing units (GPUs).

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

The cloud gaming server may be configured to provide resources to one or more clients and/or applications. That is, the cloud gaming server may be configured with resources capable of high throughput. For example, there are limits to the performance that an individual graphics processing unit (GPU) can attain, e.g. deriving from the limits on how large the GPU can be. To render even more complex scenes or use even more complex algorithms (e.g. materials, lighting, etc.) when generating a scene, it may be desirable to use multiple GPUs to render a single image.

However, usage of those GPUs equally is difficult to achieve. For example, distributing workload evenly between GPUs is difficult, which causes some GPUs to complete their workload faster than other GPUs in a particular processing cycle. GPUs that are executing faster will wait (e.g. sitting idle) for the other GPUs to finish processing their respective workloads and copy their results to other GPUs, as data generated by one GPU may be used by another GPU in the next processing cycle. Also, GPUs that are connected via a lower speed bus have a significant disadvantage compared to GPUs that are connected via a high speed bus with shared memory. As images or buffers get larger, the size of the copy increases and becomes a bottleneck. As a result of this inefficiency (e.g. waiting for copies from other GPUs, idle time during synchronization, added latency, etc.), using traditional technologies, it was difficult to process four times the data even though there may be four times the number of GPUs available. For example, even though there are multiple GPUs to process an image for an application in the past, there was not the ability to support a corresponding increase in both screen pixel count and density of geometry (e.g., four GPUs cannot write four times the pixels and/or process four times the vertices or primitives for an image).

It is in this context that embodiments of the disclosure arise.

SUMMARY

Embodiments of the present disclosure relate to using multiple GPUs in collaboration to process data or an image.

Embodiments of the present disclosure disclose a method for graphics processing. The method including executing a plurality of kernels using a plurality of graphics processing units (GPUs), wherein responsibility for executing a corresponding kernel is divided into one or more portions each of which being assigned to a corresponding GPU. The method including generating a plurality of dependency data at a first kernel as each of a first plurality of portions of the first kernel completes processing. The method including checking dependency data from one or more portions of the first kernel prior to execution of a portion of a second kernel. The method including delaying execution of the portion of the second kernel as long as the corresponding dependency data of the first kernel has not been met.

Other embodiments of the present disclosure disclose a non-transitory computer-readable medium for performing a method. The computer-readable medium including program instructions for executing a plurality of kernels using a plurality of graphics processing units (GPUs), wherein responsibility for executing a corresponding kernel is divided into one or more portions each of which being assigned to a corresponding GPU. The computer-readable medium including program instructions for generating a plurality of dependency data at a first kernel as each of a first plurality of portions of the first kernel completes processing. The computer-readable medium including program instructions for checking dependency data from one or more portions of the first kernel prior to execution of a portion of a second kernel. The computer-readable medium including program instructions for delaying execution of the portion of the second kernel as long as the corresponding dependency data of the first kernel has not been met.

Still other embodiments of the present disclosure disclose a computer system including a processor and memory coupled to the processor and having stored therein instructions that, if executed by the computer system, cause the computer system to execute a method. The method including executing a plurality of kernels using a plurality of graphics processing units (GPUs), wherein responsibility for executing a corresponding kernel is divided into one or more portions each of which being assigned to a corresponding GPU. The method including generating a plurality of dependency data at a first kernel as each of a first plurality of portions of the first kernel completes processing. The method including checking dependency data from one or more portions of the first kernel prior to execution of a portion of a second kernel. The method including delaying execution of the portion of the second kernel as long as the corresponding dependency data of the first kernel has not been met.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 12A-12D illustrate the checking of dependency data by a portion of a kernel that is a function of an index range of that portion, in accordance with embodiments of the disclosure.

FIGS. 13A-C illustrate various strategies for addressing when a function of the index range of a portion of a kernel is outside of a defined index space, in accordance with embodiments of the disclosure.

FIG. 14B illustrates the allocation of portions of a kernel following the order of allocation outlined in the GPU space filling curves defined in FIG. 14A, in accordance with one embodiment of the disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, embodiments of the present disclosure disclose methods and systems for executing kernels, wherein a number of graphics processing units (GPUs) collaborate to process an image or data. A kernel being processed is split into portions. While processing an image or buffer, GPUs are assigned to portions of kernels, and dependency data is tracked between these portions, thereby allowing balanced workloads across GPUs using fine grained, region based dependency data between kernels.

With the above general understanding of the various embodiments, example details of the embodiments will now be described with reference to the various drawings.

Throughout the specification, the reference to "application" or "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Throughout the specification, various embodiments of the present disclosure are described for multi-GPU processing of kernels for an application using an exemplary architecture having four GPUs. However, it is understood that any number of GPUs (e.g., two or more GPUs) may collaborate when generating images and/or data for an application.

Figure 1:
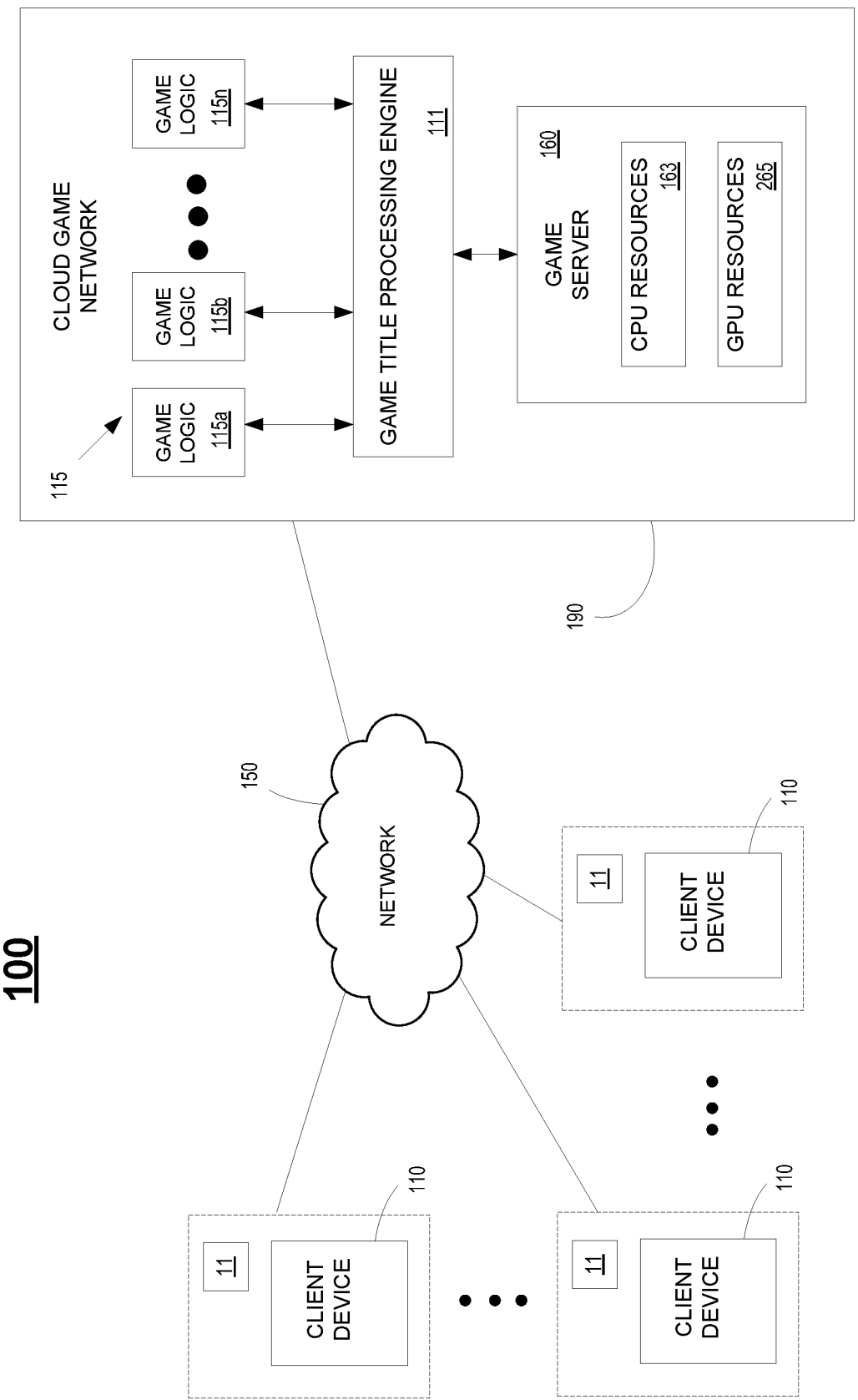
FIG. 1 is a diagram of a system for providing gaming over a network between one or more cloud gaming servers configured for implementing multiple GPUs in collaboration to render a single image.

FIG. 1 is a diagram of a system for executing kernels when processing an application, wherein a number of graphics processing units (GPUs) collaborate to process an image or data, in accordance with one embodiment of the present disclosure. In one embodiment, the system is configured to provide gaming over a network between one or more cloud gaming servers. Cloud gaming includes the execution of a video game at the server to generate game rendered video frames, which are then sent to a client for display.

Although FIG. 1 illustrates the implementation of multi-GPU execution of kernels between one or more cloud gaming servers of a cloud gaming system, other embodiments of the present disclosure provide for executing kernels when processing an application, wherein a number of graphics processing units (GPUs) collaborate to process an image or data, within a stand-alone system, such as a personal computer or gaming console that includes a high-end graphics card having multiple GPUs.

It is also understood that the multi-GPU execution of kernels may be performed using physical GPUs, or virtual GPUs, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. GPU utilization defined for the user or game can be utilized when saving a user's gaming session. The GPU utilization can include any number of configurations described herein to optimize the fast rendering of video frames for a gaming session. In one embodiment, the GPU utilization defined for the game or the user can be transferred between data centers as a configurable setting. The ability to transfer the GPU utilization setting enables for efficient migration of game play from data center to data center in case the user connects to play games from different geo locations.

System 100 provides gaming via a cloud game network 190, wherein the game is being executed remote from client device 110 (e.g. thin client) of a corresponding user that is playing the game, in accordance with one embodiment of the present disclosure. System 100 may provide gaming control to one or more users playing one or more games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 190 includes a game server 160 that provides access to a plurality of video games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 190 via communication network 150 using corresponding client devices 110 configured for receiving streaming media. In one embodiment, client device 110 may be configured as a thin client providing interfacing with a back end server (e.g. cloud game network 190) configured for providing computational functionality (e.g. including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 190 may be executing one or more game logics that are built upon a game title processing engine 111, as executed using the CPU resources 163 and GPU resources 265 of the game server 160. For instance, game logic 115a in cooperation with game title processing engine 111 may be executing on game server 160 for one client, game logic 115b in cooperation with game title processing engine 111 may be executing on game server 160 for a second client, and game logic 115n in cooperation with game title processing engine 111 may be executing on game server 160 for an Nth client.

In particular, client device 110 of a corresponding user (not shown) is configured for requesting access to games over a communication network 150, such as the internet, and for rendering for display images generated by a video game executed by the game server 160, wherein encoded images are delivered to the client device 110 for display in association with the corresponding user. For example, the user may be interacting through client device 110 with an instance of a video game executing on game processor of game server 160. More particularly, an instance of the video game is executed by the game title processing engine 111. Corresponding game logic (e.g. executable code) 115 implementing the video game is stored and accessible through a data store (not shown), and is used to execute the video game. Game title processing engine 111 is able to support a plurality of video games using a plurality of game logics (e g gaming application), each of which is selectable by the user.

For example, client device 110 is configured to interact with the game title processing engine 111 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 160 over network 150. The back-end game title processing engine 111 is configured for generating rendered images, which is delivered over network 150 for display at a corresponding display in association with client device 110. For example, through cloud based services the game rendered images may be delivered by an instance of a corresponding game (e.g. game logic) executing on game executing engine 111 of game server 160. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 160 and/or the game title processing engine 111 includes basic processor based functions for executing the game and services associated with the gaming application. For example, game server 160 includes central processing unit (CPU) resources 163 and graphics processing unit (GPU) resources 265 that are configured for performing processor based functions include 2D or 3D rendering, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, one or more applications share a particular GPU resource. In one embodiment, multiple GPU devices may be combined to perform graphics processing for a single application that is executing on a corresponding CPU.

In one embodiment, cloud game network 190 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2:
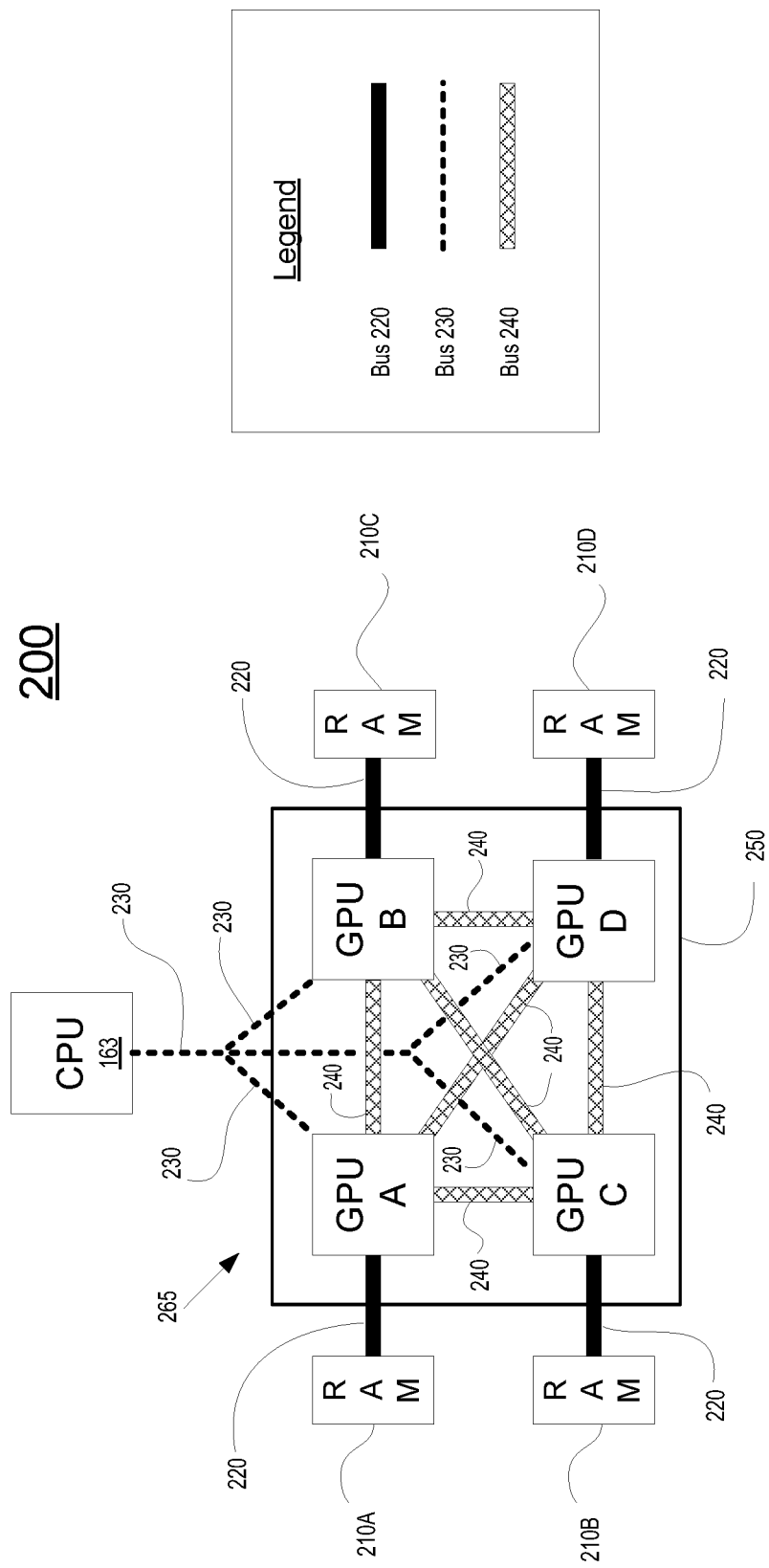
FIG. 2 is a diagram of a multi-GPU architecture wherein multiple GPUs collaborate to process data or an image, in accordance with one embodiment of the present disclosure.

FIG. 2 is a diagram of an exemplary multi-GPU architecture 200 wherein multiple GPUs collaborate to generate data and/or render a single image of a corresponding application, in accordance with one embodiment of the present disclosure. It is understood that many architectures are possible in various embodiments of the present disclosure in which multiple GPUs collaborate to generate data and/or render images though not explicitly described or shown. For example, multi-GPU collaboration to execute kernels when processing images and/or data may be implemented between one or more cloud gaming servers of a cloud gaming system, or may be implemented within a stand-alone system, such as a personal computer or gaming console that includes a high-end graphics card having multiple GPUs, etc.

The multi-GPU architecture 200 includes a CPU 163 and multiple GPUs configured for multi-GPU rendering of a single image for an application, and/or each image in a sequence of images for the application. In particular, CPU 163 and GPU resources 265 are configured for performing processor based functions include 2D or 3D rendering, physics simulation, scripting, audio, animation, graphics processing, lighting, shading, rasterization, ray tracing, shadowing, culling, transformation, artificial intelligence, etc., as previously described.

For example, four GPUs are shown in GPU resources 265 of the multi-GPU architecture 200, though any number of GPUs may be utilized when generating data and or rendering images for an application. Each GPU is connected via a high speed bus 220 to a corresponding dedicated memory, such as random access memory (RAM). In particular, GPU-A is connected to memory 210A (e.g., RAM) via bus 220, GPU-B is connected to memory 210B (e.g., RAM) via bus 220, GPU-C is connected to memory 210C (e.g., RAM) via bus 220, and GPU-D is connected to memory 210D (e.g., RAM) via bus 220.

Further, each GPU is connected to each other via bus 240 that depending on the architecture may be approximately equal in speed or slower than bus 220 used for communication between a corresponding GPU and its corresponding memory. For example, GPU-A is connected to each of GPU-B, GPU-C, and GPU-D via bus 240. Also, GPU-B is connected to each of GPU-A, GPU-C, and GPU-D via bus 240. In addition, GPU-C is connected to each of GPU-A, GPU-B, and GPU-D via bus 240. Further, GPU-D is connected to each of GPU-A, GPU-B, and GPU-C via bus 240.

CPU 163 connects to each of the GPUs via a lower speed bus 230 (e.g., bus 230 is slower than bus 220 used for communication between a corresponding GPU and its corresponding memory). In particular, CPU 163 is connected to each of GPU-A, GPU-B, GPU-C, and GPU-D.

In some embodiments, the four GPUs are discrete GPUs, each on their own silicon die. In other embodiments, the four GPUs may share a die in order to take advantage of high speed interconnects and other units on the die. In yet other embodiments, there is one physical GPU 250 that can be configured to be used either as a single more powerful GPU or as four less powerful "virtual" GPUs (GPU-A, GPU-B, GPU-C and GPU-D). That is to say, there is sufficient functionality for GPU-A, GPU-B, GPU-C and GPU-D each to operate a graphics pipeline (as shown in FIG. 4), and the chip as a whole can operate a graphics pipeline (as shown in FIG. 4), and the configuration can be flexibly switched (e.g. between rendering passes) between the two configurations.

Figure 3:
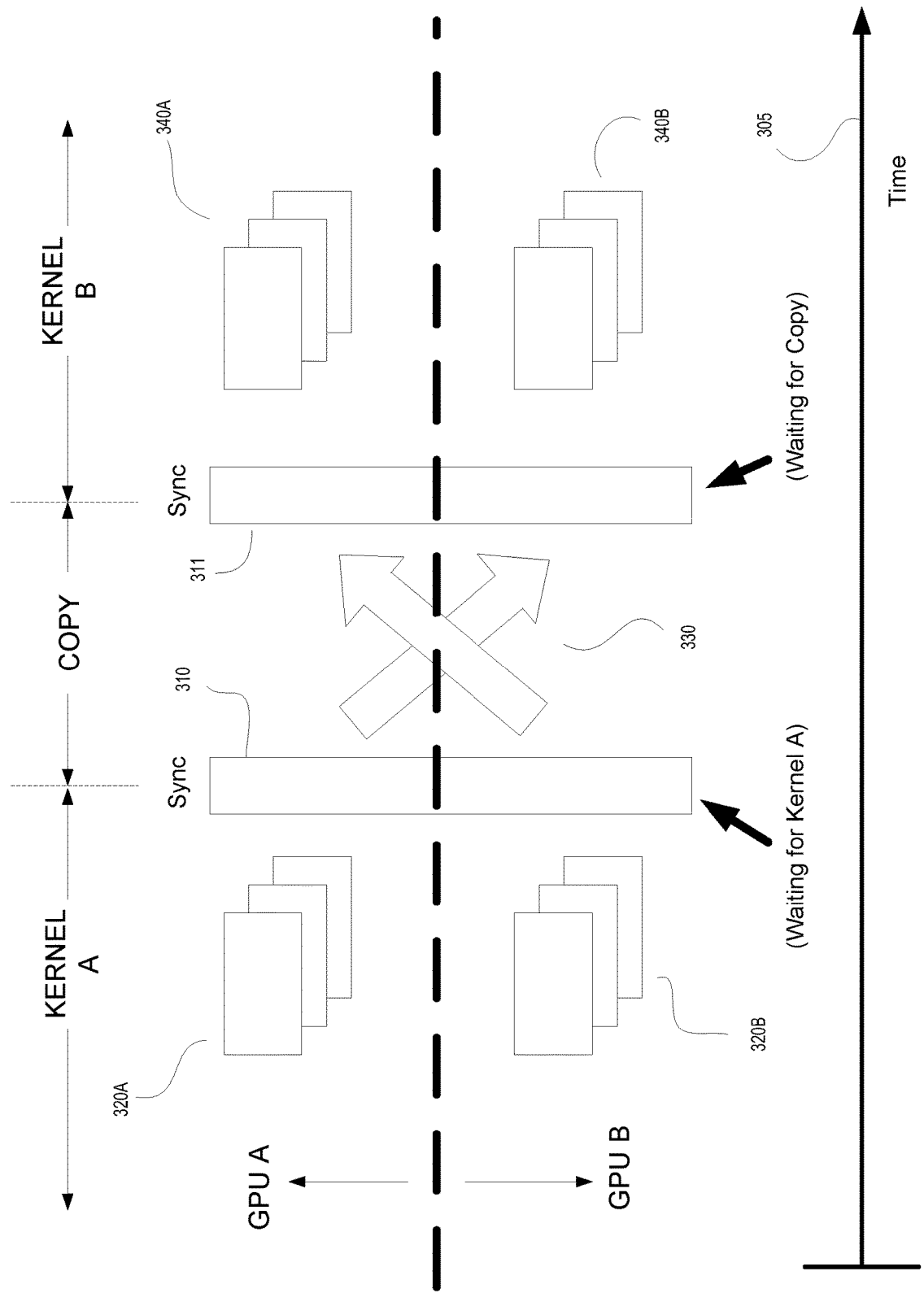
FIGS. 3-5 illustrate timelines showing the kernel dependency and the copying of data after a kernel has completed processing and GPU inefficiency when not using data dependencies.
Figure 4:
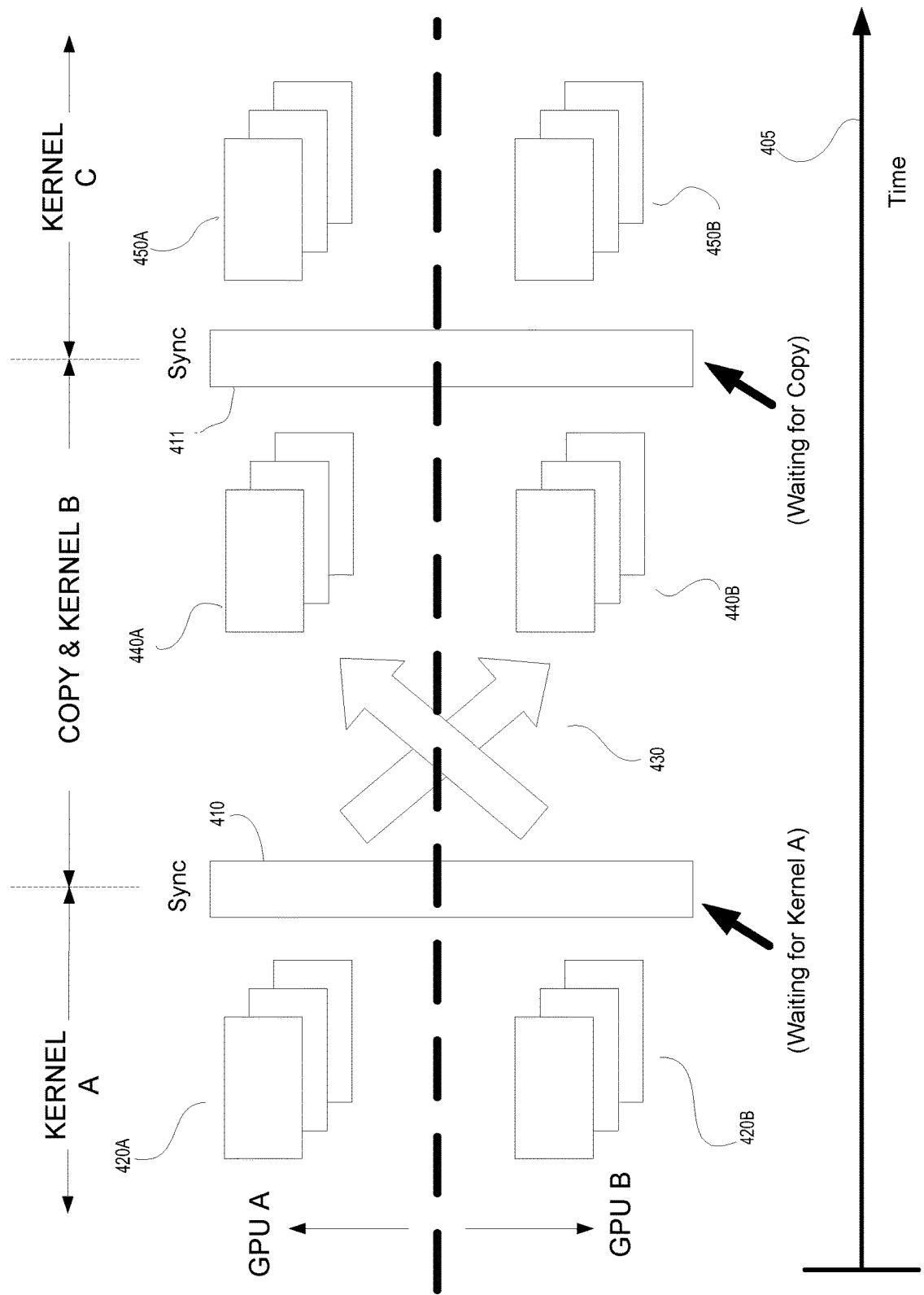
Figure 5:
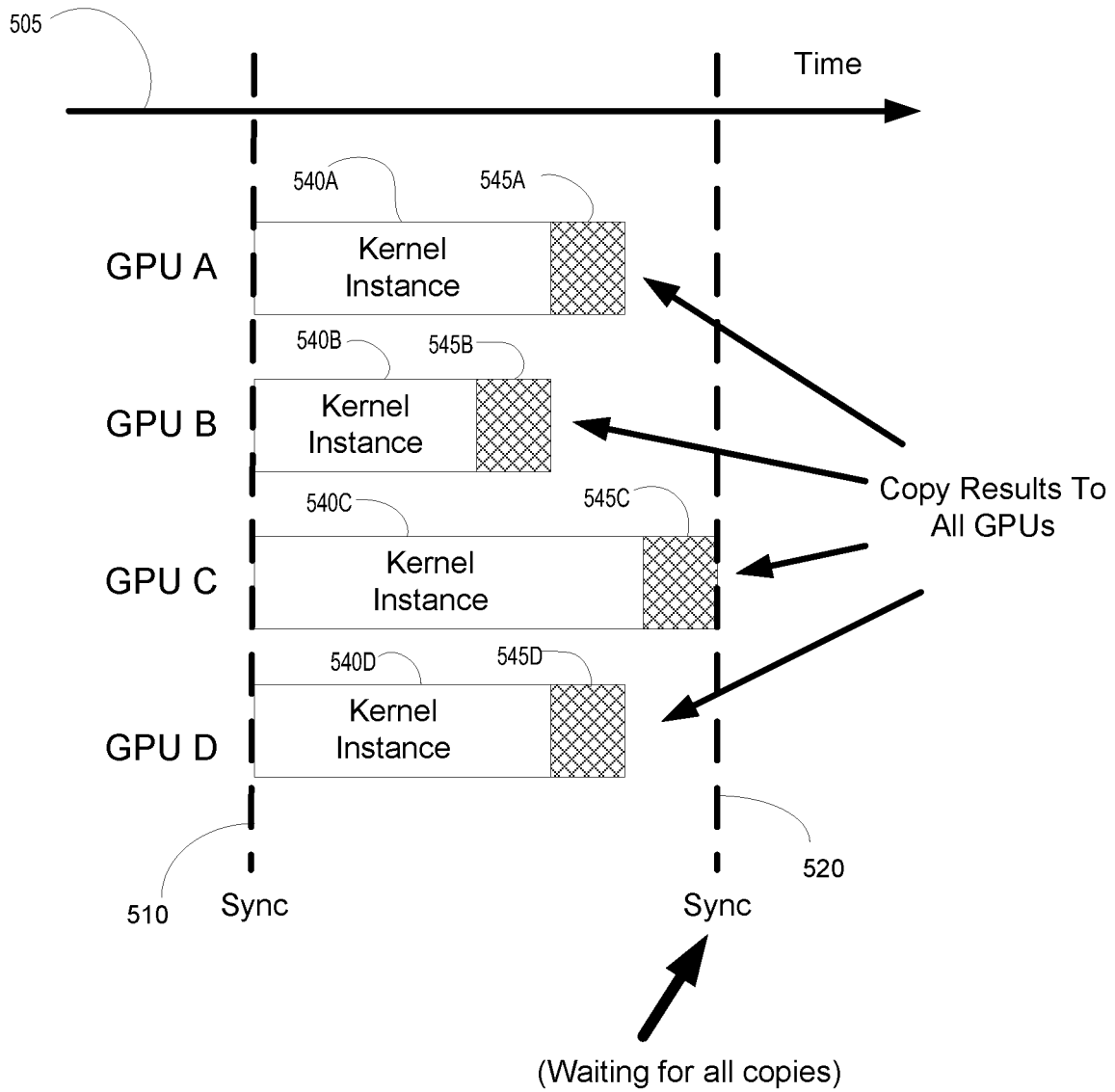

FIGS. 3 through 5 illustrate possible scenarios where GPUs having dedicated memory that are connected via a lower speed bus sit idle or have increased latency when performing copy operations from one GPU when dependency data is not used.

In particular, FIG. 3 illustrates a timeline 305 showing kernel dependency and the copying of data after a kernel has completed processing, wherein a kernel (also referred to as "compute kernel") is a program executing on a GPU that may read or write data in image resources or buffer resources. For example, kernel A generates and writes data that kernel B then reads and uses for processing. Kernels A and B may be divided into work-groups or portions that are separately executed by different GPUs. For illustration, kernel A may be divided into a plurality of portions, wherein GPU A is allocated one or more portions 320A of kernel A for execution, and GPU B is allocated one or more portions 320B of kernel A for execution. Also, kernel B may be divided into a plurality of portions, wherein GPU A is allocated one or more portions 340A of kernel B for execution, and GPU B is allocated one or more portions 340B of kernel B for execution. As such, each of kernel A and kernel B may be executed by more one or more GPUs.

As shown, one or more portions of kernel B may be dependent on data from one or more portions of kernel A. As such, copy operations 330 need to be performed. In particular, if high speed access to the results of kernel A are desired, because kernel B is dependent on the previously executed kernel A, memory that is written to by kernel A needs to be copied to all other GPUs (e.g. GPU B), before kernel B can begin executing on one or more GPUs. That is, it is necessary to wait for work from kernel A to complete and be copied before running kernel B. For example, synchronization point 310 provides for the completion of all portions of kernel A before the start of copy operations 330. Because there may be unbalanced workloads between portions allocated to GPU A and/or GPU B, GPU A or GPU B (or some execution units of GPU A or GPU B) may sit idle or be not fully utilized while waiting for other portions to finish processing at synchronization point 310 before copy operations 330 begin.

Further, no portion of kernel B can begin until copying of memory written to by kernel A to all other GPUs has completed at synchronization point 311, because it is unknown which dependencies are fulfilled during execution of kernel A, and it is unclear as to whether the dependencies required by kernel B have been fulfilled. As shown, portions of kernel A on GPU A or GPU B may be finished with copying and GPU A or GPU B are sitting idle until all portions of kernel A have completed their respective copy operation 330 at synchronization point 311.

FIG. 4 illustrates a timeline 405 showing kernel dependency and the hiding of the cost of copying data after a kernel has completed processing during execution of a separate kernel, wherein a kernel is a program executing on a GPU that may read or write data in image resources or buffer resources. For example, kernel A generates and writes data that kernel C then reads and uses for processing. A separate kernel B may also be required. Kernels A, B, and C may each be divided into work-groups or portions that are separately executed by different GPUs. For illustration, kernel A may be divided into a plurality of portions, wherein GPU A is allocated one or more portions 420A for execution and GPU B is allocated one or more portions 420B for execution. Also, kernel B may be divided into a plurality of portions, wherein GPU A is allocated one or more portions 440A for execution, and GPU B is allocated one or more portions 440B for execution. Further, kernel C may be divided into a plurality of portions, wherein GPU A is allocated one or more portions 450A for execution, and GPU B is allocated one or more portions 450B for execution. As such, each of kernels A, B and C may be executed by more one or more GPUs.

As shown, one or more portions of kernel C may be dependent on data from one or more portions of kernel A. That is, kernel A writes data that kernel C then reads, such as in cases where high bandwidth access to the results of kernel A is desired. As such, copy operations 430 need to be performed. In particular, because kernel C is dependent on the previously executed kernel A, memory that is written to by kernel A needs to be copied to all other GPUs (e.g. GPU A and/or GPU B), before kernel C can begin executing on one or more GPUs. As previously described, there may be a cost of copying memory that is written to by kernel A, as some GPUs may sit idle waiting for all portions of kernel A to complete, and/or kernel C cannot begin execution until the copy operations 430 have been completed.

There may be a way to hide the cost of the copy operations 430, by performing the copy operations 430 along with another, separate operation. For example, copy operations 430 may be performed while kernel B is executing. As shown, synchronization point 410 provides for the completion of all portions of kernel A before the start of copy operations 430. Again, because there may be unbalanced workloads between portions allocated to GPU A and/or GPU B, GPU A or GPU B may sit idle waiting for other portions to finish processing at synchronization point 410 before copy operations 430 begin. During copy operations 430, portions 440A of kernel B executing on GPU A and portions 440B of kernel B executing on GPU B may be completed.

No portion of kernel C can begin until copying of memory written to by kernel A to all other GPUs has completed at synchronization point 411, because it is unknown which dependencies are fulfilled during execution of kernel A, and it is unclear as to whether the dependencies required by kernel C have been fulfilled. As shown, portions of kernel A on GPU A or GPU B may be finished with copying and are sitting idle until all portions have completed their respective copy operation 430 at synchronization point 411. However, even though the cost of copying is hidden in the execution of kernel B, there is an additional cost. In particular, latency is added to the start of executing kernel C, because kernel B must execute to completion at synchronization point 411 before kernel C begins execution.

FIG. 5 illustrates a timeline 505 showing execution of a kernel that is divided evenly across multiple GPUs, wherein workloads between GPUs may be different. As shown, a kernel is divided equally among four GPUs, including GPU A, GPU B, GPU C, and GPU D. For example, a kernel may perform a lighting function when rendering an image, and the kernel may be divided evenly by the number of pixels. Each GPU receives a portion of the kernel for execution and copying of results to the other GPUs between synchronization points 510 and 520 along timeline 505, as previously described in FIGS. 3 and 4. As shown, GPU A includes kernel instance 540A executing a unique portion of the kernel, after which a copy operation 545A is performed to copy results to all other GPUs. A kernel instance may include values associated with the arguments in the corresponding portion, wherein the portion is defined by an index range in an index space of the kernel. Also, GPU B includes kernel instance 540B executing a unique portion of the same kernel, after which a copy operation 545B is performed to copy results to all other GPUs. GPU C includes kernel instance 540C executing a unique portion of the same kernel, after which a copy operation 545C is performed to copy results to all other GPUs. Finally, GPU D includes kernel instance 540D executing a unique portion of the same kernel, after which a copy operation 545D is performed to copy results to all other GPUs.

Load balancing multiple GPUs may be performed by the application developer to attempt to execute even workloads on all GPUs, otherwise the application may suffer some loss of performance with unbalanced workloads. However, predicting balanced workloads across all GPUs is difficult, especially with non-homogenous GPUs. As an illustration, dividing workload up front or by the application developer may be inefficient, as some workloads may take longer on some GPUs due to different inputs. Following the example where the kernel may perform a lighting function, and be divided equally among the GPUs by the number of pixels, it may be hard to predict the workloads performed for each pixel or tiles of pixels (e.g. portion of image buffer), because there may be different inputs for different tiles (e.g., different number of lights, different shading models, etc.). This may cause longer computation times for some portions of the kernel. While waiting for some GPUs executing portions of kernels to complete and finish copying, other GPUs that have finished executing portions of kernels and copying results sit idle waiting for all the copy operations to complete. For example, GPU A, GPU B, and GPU D all sit idle waiting for GPU C to finish its copy operations, wherein GPU B sits idle the longest between synchronization points 510 and 520.

As shown in FIG. 5, because of these inefficiencies (e.g. time waiting for copies from all GPUs, idle time during synchronization, and added latency), GPUs that are connected via a lower speed bus and each with dedicated memory may be at a significant disadvantage compared to GPUs that are connected via a high speed bus with shared memory. As image resources or buffer resources get larger, the size of and length of time for the copy may increase thereby causing increased inefficiencies, and may become a further bottleneck. As a result of these inefficiencies and without using data dependencies of embodiments of the present disclosure, it becomes difficult to process N times the data, even though there may be N times the number of GPUs available.

A GPU may be implemented to perform compute shader functionality, or graphics shader (e.g., pixel or vertex shader) functionality in embodiments of the present disclosure. For example, a GPU may be responsible for rendering objects (e.g. writing color or other data) to pixels of an image or multiple images, in addition to kernel invocation that may perform graphics or non-graphics related processing. One or several command buffers define actions for the GPU to perform. As an illustration, actions performed by a GPU may include rendering objects via draw commands and state information needed to render the objects. Another action performed by a GPU may include kernel invocation via kernel invocation commands along with the state information needed to execute the kernel. Other actions performed by a GPU may include synchronization commands used to wait for the completion of a draw command, or kernel invocation, or graphics pipeline, or some other condition. Still other actions may include the configuration of a GPU, to include configuration of buffers or images for kernel invocations, location and format of render targets (e.g. MRTs), scan-out, depth test state, etc.

A GPU executes commands, wherein the GPU may be executed to perform graphics processing (e.g. render objects), or non-graphics functionality (e.g. perform kernel invocations). A "command" is data that the GPU reads, and performs an action based on the command A "kernel invocation command" is a specific command used to perform kernel invocation. A "draw command" is a specific command used to render an object.

A "command buffer" is a container for one or more commands, wherein the GPU executes the commands by reading them from a corresponding command buffer. In particular, a GPU may be configured to execute commands from a corresponding command buffer. Commands and/or operations performed when rendering objects and/or executing kernels may be ordered, such that commands and/or operations may be dependent on other commands and/or operations (e.g. commands in one command buffer may need to complete execution before other commands in that command buffer can execute). Also, commands and/or operations performed by one GPU may be dependent on other commands and/or operations performed by another GPU, such that they are performed in sequence by one or more GPUs. Each GPU may have their own command buffers, in one embodiment. Alternatively, GPUs may use the same command buffer or the same set of command buffers (e.g., when substantially the same set of objects are being rendered by each GPU).

Also, a command buffer may be defined to execute on all or a subset of GPUs in a multi-GPU architecture. In a multi-GPU architecture, memory may need to be explicitly copied between GPUs using commands in the command buffer. Rather than synchronizing GPUs via synchronization commands in the command buffer, embodiments of the present disclosure minimize the use of synchronization commands by using dependency data, as will be further described. Also, embodiments of the present disclosure are capable of performing static and/or dynamic load balancing of workloads between multiple GPUs.

Many architectures are possible in which multiple GPUs collaborate to render an image or execute kernels. For example, multi-GPU architectures may be implemented between one or more cloud gaming servers of a cloud gaming system, or implemented within a stand-alone system, such as a personal computer or gaming console that includes a high-end graphics card having multiple GPUs. In one embodiment, each GPU of a multi-GPU architecture may be able to access shared memory via a high speed bus. In another multi-GPU architecture, each GPU may have local memory that is accessed via a high speed bus, and wherein access to memory of other GPUs may be performed via a low speed bus, as previously described in the architecture shown in FIG. 2 of another embodiment.

Figure 6:
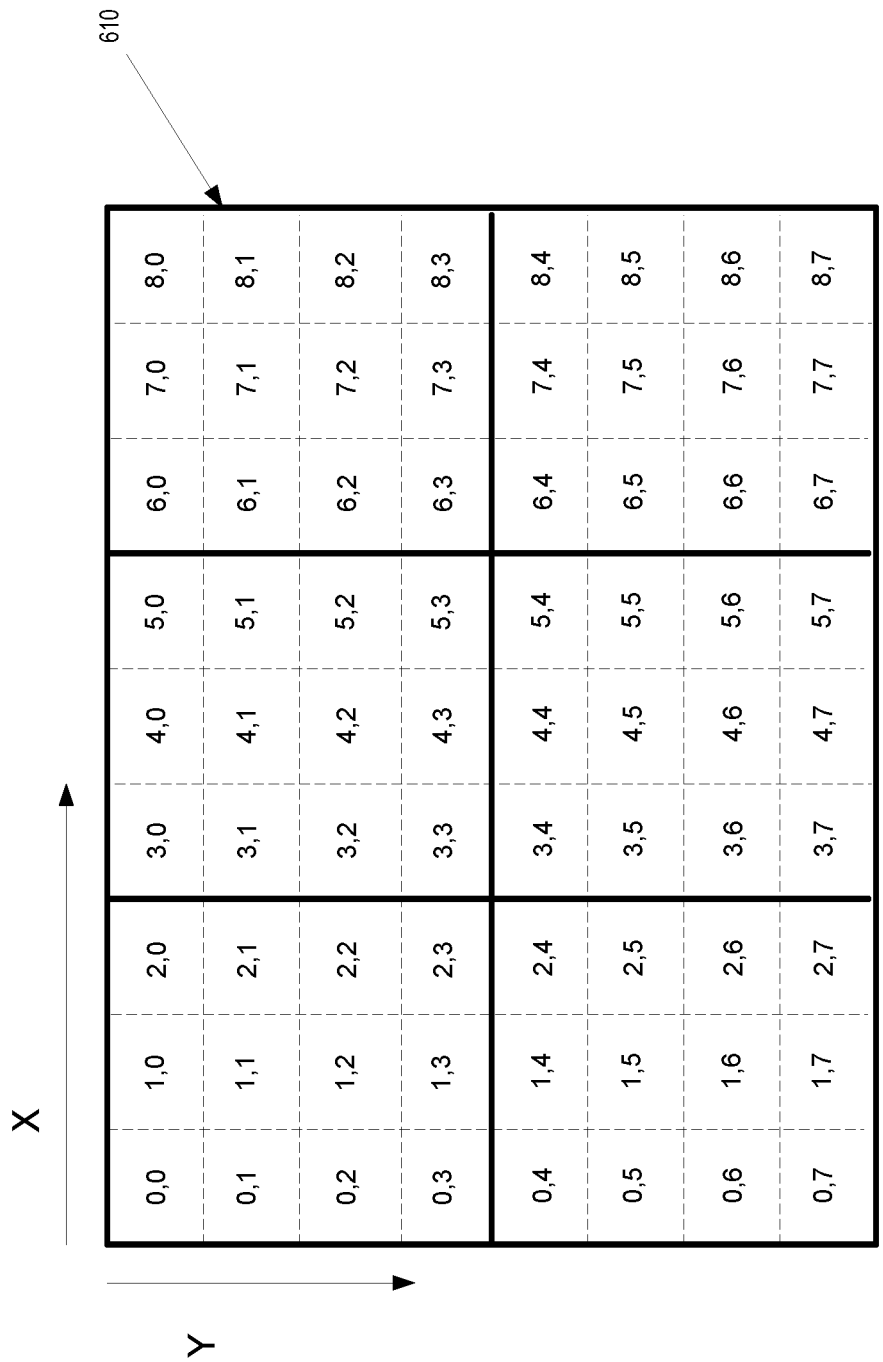
FIG. 6 illustrates a kernel invocation in N dimensions that is partitioned into multiple portions that are allocated to multiple GPUs for execution, in accordance with one embodiment of the disclosure.

FIG. 6 illustrates a kernel invocation 600 in N dimensions, in accordance with one embodiment of the disclosure. In particular, an "index space" is a N-dimensional space used for the kernel invocation 600, wherein a kernel function executes for each point or indice in the index space. For purposes of illustration only, kernel invocation 600 may be represented by a 2 dimensional space (x and y dimensions) that includes 9×8 indices.

Portions of the kernel invocation 600 are allocated to multiple GPUs for execution. As previously introduced, a kernel or compute kernel as executed by the kernel invocation 600 is a program to execute on a GPU that may read or write images or buffers, wherein the kernel may include arguments and/or values associated with the arguments used. The kernel invocation 600 shown may be divided into portions based on corresponding N-dimensional index ranges, wherein each portion may be an entire index space or a subset thereof in each dimension utilized by the kernel. That is, an "index range" defines a portion of the N-dimensional index space, wherein one or more index ranges can be used to divide the kernel invocation into portions. As such, a "portion" defines a part of a kernel or kernel invocation 600, wherein each portion may be an index or index range in the N-dimensional index space. As a representative example, kernel invocation 600 is split along two dimensions into six portions. Each portion of the kernel invocation 600 includes 12 indices at which the kernel function will be evaluated. For example, portion 610 includes indices (6,0), (7,0), (8,0), (6,1), (7,1), (8,1), (6,2), (7,2), (8,2), (6,3), (7,3), and (8,3). One or more portions of the kernel as executed by the kernel invocation 600 may be associated with some dependency data.

A portion of a kernel as executed by a kernel invocation may read from or write to a region of a "resource", which may be a memory resource. In particular, a resource may include input and output data used by a kernel. For example, a resource may be a buffer resource or image resource, and may be configured in multiple dimensions or as a cube map. In some embodiments, the resource may be defined by one, or two, or three dimensions, or may be defined by a cube map.

A "region" is a part of a resource, and is associated with a portion of a kernel. For example, a region may define an area of an image that corresponds to a portion of a 2-D kernel as executed by a corresponding kernel invocation. In one embodiment, a region corresponds to a subset of a resource and includes each dimension utilized by the kernel, such as a tile of an image resource or a range in a buffer. For example, a "tile" may be a type of region (e.g., of an image resource) that defines an area of an image. The index range of a corresponding portion of the kernel may be used to determine which region of a resource to process.

Figure 7A:
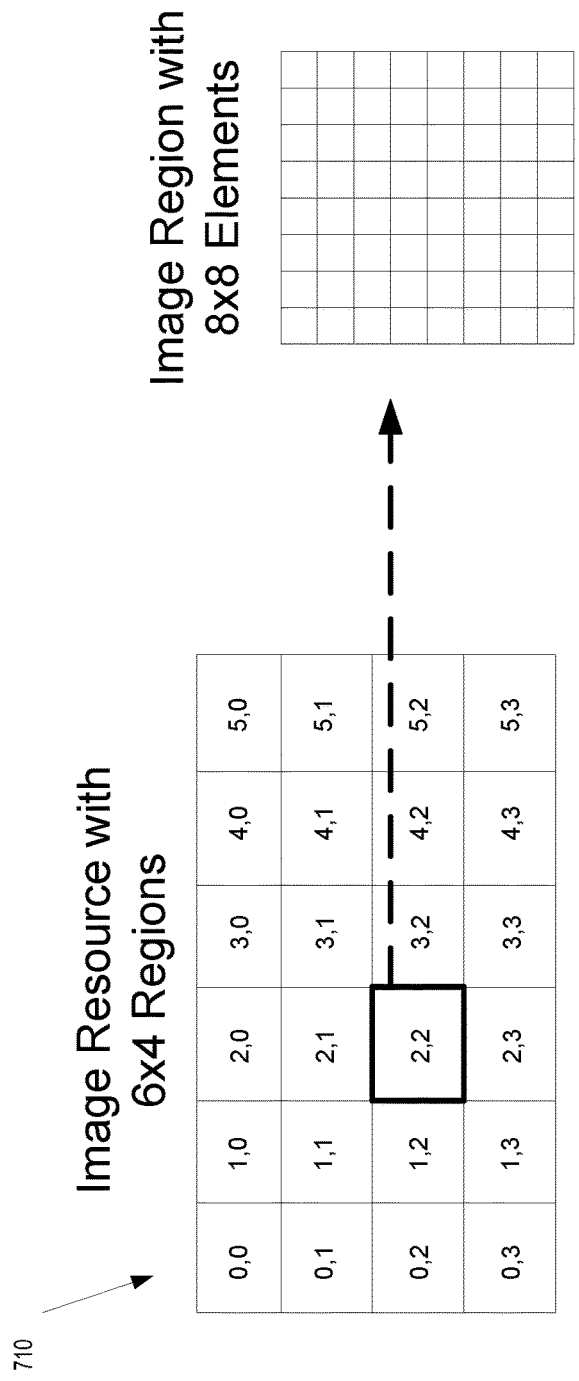
FIG. 7A illustrates an image resource split into regions, in accordance with one embodiment of the disclosure.
Figure 7B:
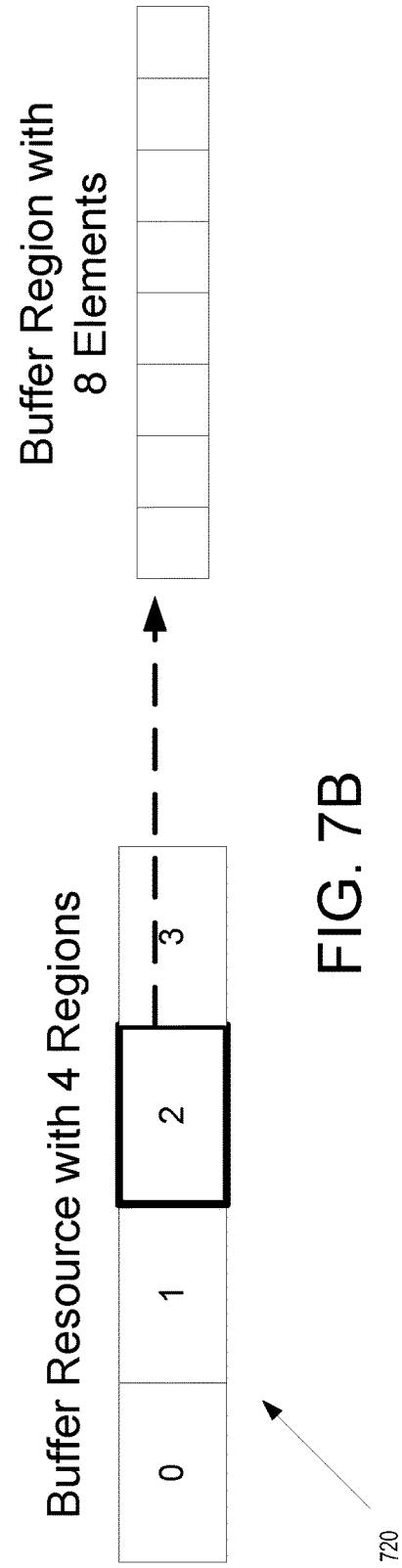
FIG. 7B illustrates a buffer resource split into regions, in accordance with one embodiment of the disclosure.

For purposes of illustration, FIG. 7A illustrates an image resource 710 split into twenty-four regions. Further, each of the regions in image resource 710 has sixty-four elements. For example, a blown up image of region (2,2) includes 8×8 or sixty-four elements. Also for purposes of illustration, FIG. 7B illustrates a buffer resource 720 split into four regions. Further, each of the regions in buffer resource 720 has eight elements. For example, a blown up image of region 2 includes eight elements.

Figure 8:
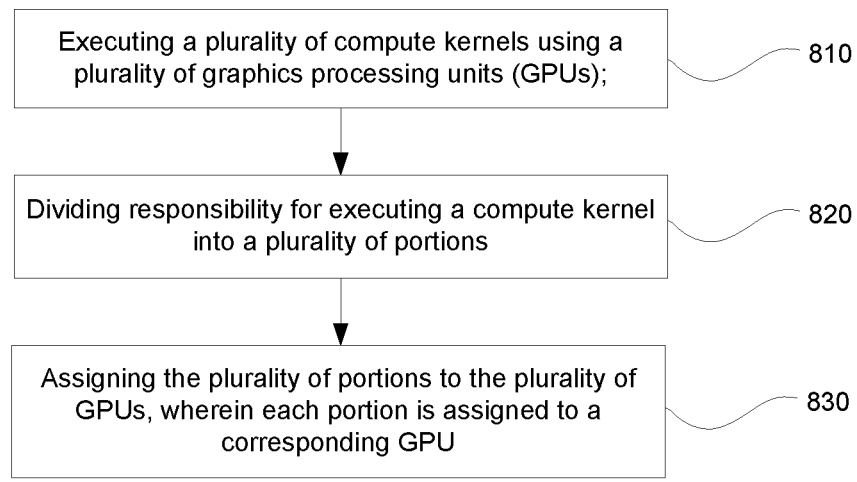
FIG. 8 is a flow diagram illustrating steps in a method for graphics processing that includes processing a kernel using multiple GPUs, in accordance with one embodiment of the disclosure.
Figure 9:
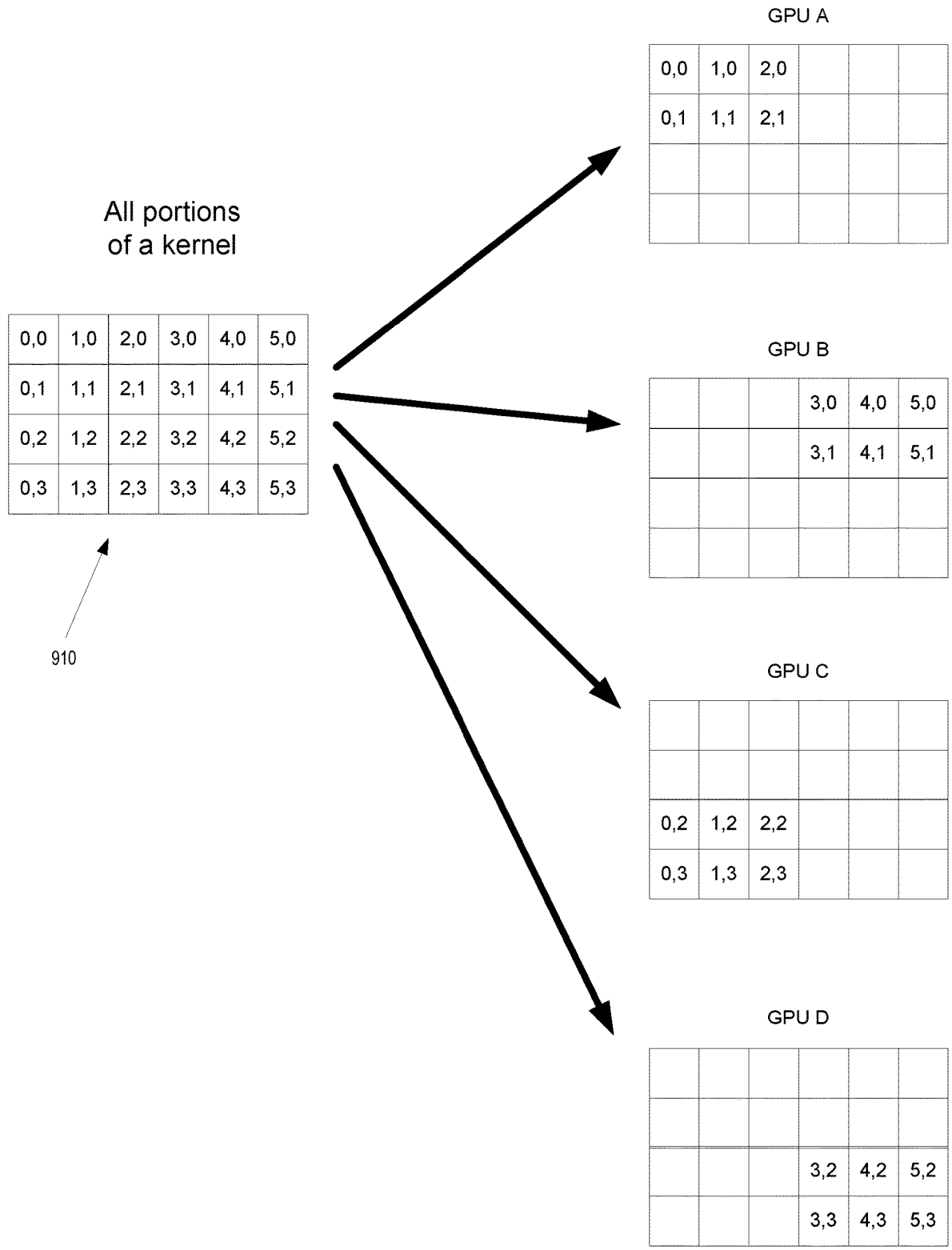
FIG. 9 illustrates a fixed or static allocation scheme to distribute portions of a kernel evenly across multiple GPUs, in accordance with one embodiment of the disclosure.

With the detailed description of multi-GPU architectures and their implementations previously described in FIGS. 1-7, flow diagram 800 of FIG. 8 illustrates a method for graphics processing including processing a kernel using multiple GPUs, wherein a number of GPUs collaborate to process an image or data, in accordance with one embodiment of the disclosure. As previously described, various architectures may include multiple GPUs collaborating to process an image or data, such as within one or more cloud gaming servers of a cloud gaming system, or within a stand-alone system, such as a personal computer or gaming console that includes a high-end graphics card having multiple GPUs, etc.

At 810, the method includes executing a plurality of kernels using a plurality of GPUs, wherein each kernel includes a program executed on a multi-GPU architecture that may read or write to image or buffer resources. In addition, a kernel invocation is used to execute a corresponding kernel, wherein the kernel is a program executing on one or more GPUs that may read or write data in image or buffer resources. A kernel invocation may be defined by an index space, wherein each indice may include arguments and/or values associated with arguments used for executing a corresponding portion of the kernel, wherein the portion is defined by an index range in an index space.

At 820, the method includes dividing responsibility for executing a kernel into a plurality of portions. There may be some GPUs that have other responsibilities, and are not used for executing kernels.

At 830, the method includes assigning the plurality of portions to the plurality of GPUs, wherein each portion is assigned to a corresponding GPU. In particular, a kernel invocation may be divided into portions, wherein portions are allocated to corresponding GPUs and then executed. The GPUs execute simultaneously. Each GPU may share a command buffer, or have different command buffers (e.g. each GPU has one or more dedicated command buffers), wherein a command buffer may contain kernel invocation commands, as well as other commands (e.g. draw call commands, etc.).

Figure 10:
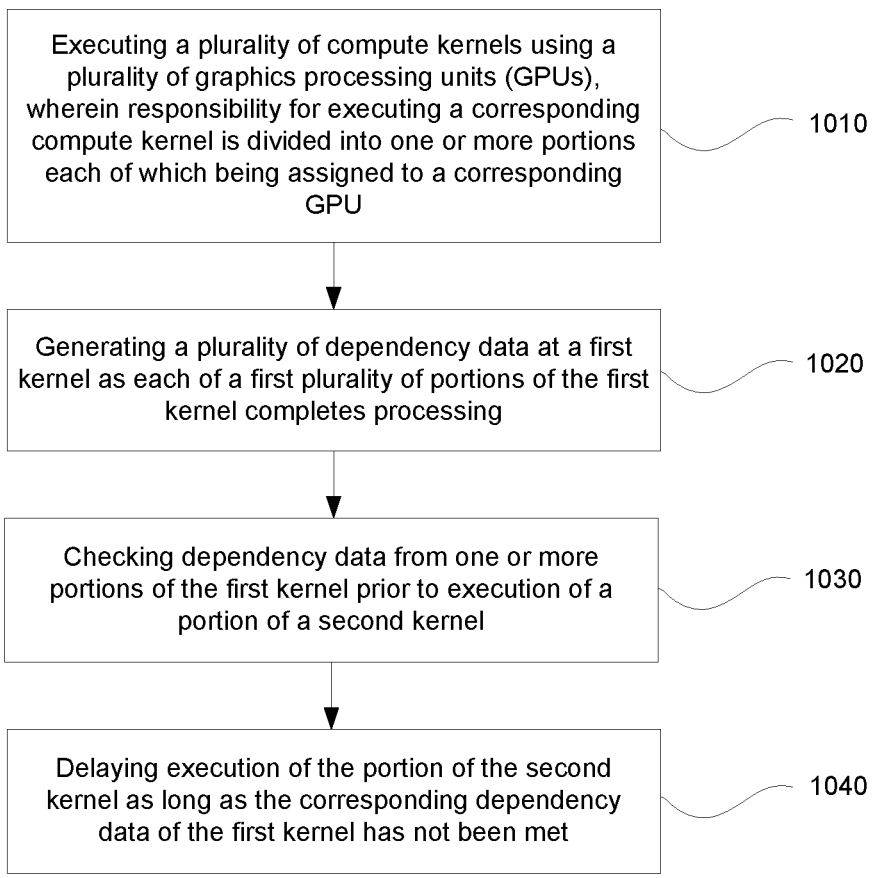
FIG. 10 is a flow diagram illustrating steps in a method for graphics processing that includes processing a kernel using multiple GPUs, with dependency tracking per kernel portion to allow for early processing of dependent portions of subsequent kernels, in accordance with one embodiment of the disclosure.

With the detailed description of multi-GPU architectures and their implementations previously described in FIGS. 1-9, flow diagram 1000 of FIG. 10 illustrates a method for graphics processing including processing a kernel using multiple GPUs, with dependency tracking per kernel portion or per region per portion to allow for early processing of dependent portions of subsequent kernels, wherein a number of GPUs collaborate to process an image or data, in accordance with one embodiment of the disclosure.

With the detailed description of multi-GPU architectures and their implementations previously described in FIGS. 1-9, flow diagram 1000 of FIG. 10 illustrates a method for graphics processing including processing a kernel using multiple GPUs, with dependency tracking per kernel portion or per region per portion to allow for early processing of dependent portions of subsequent kernels, wherein a number of GPUs collaborate to process an image or data, in accordance with one embodiment of the disclosure.

As previously described, various architectures may include multiple GPUs collaborating to process an image or data, such as within one or more cloud gaming servers of a cloud gaming system, or within a stand-alone system, such as a personal computer or gaming console that includes a high-end graphics card having multiple GPUs, etc. The GPUs execute simultaneously. In embodiments, multiple GPUs may share a command buffer, or each GPU may have one or more dedicated command buffers. A command buffer can contain kernel invocation commands, as well as other commands, such as draw call commands.

At 1010, the method includes executing a plurality of kernels using a plurality of graphics processing units (GPUs). As previously described, each kernel includes a program executed on a multi-GPU architecture that may read data from or write data to image or buffer resources. In addition, a kernel invocation is used to execute a corresponding kernel. A kernel invocation may be defined by an index space, wherein each indica may include arguments and/or values associated with arguments used for executing a corresponding portion of the kernel, wherein the portion is defined by one or more index ranges in the index space.

Also, responsibility for executing a corresponding kernel is divided into one or more portions, wherein each of the portions being assigned to a corresponding GPU. That is, a kernel invocation being processed is split or divided into portions. Each portion is allocated to a corresponding GPU for execution. As previously described, the GPUs through execution of one or more kernels collaborate to process an image or data. Also, resources (e.g. memory) read by a kernel may be divided into one or more regions, wherein a portion may read from and/or write to one or more regions of one or more resources.

At 1020, the method includes generating a plurality of dependency data at a first kernel as each of a first plurality of portions of the first kernel completes processing. That is, dependency data is generated as a corresponding portion of the kernel completes processing, wherein a kernel portion may write dependency data before the kernel portion has finished executing (i.e. before all the instructions of a kernel portion have finished executing). Dependency data is information that may be generated by each portion of the kernel. For example, the information may indicate that processing of the corresponding portion of the kernel has completed. In another example, the information may indicate that a region of a resource has been written to by the corresponding portion of the kernel. In particular, after a portion of a kernel finishes writing to a region of a resource, the portion may generate dependency data that includes that the writes to the region by the portion have been completed, and/or which GPU wrote to that region. In that manner, while processing an image or buffer resource, GPUs are assigned portions of kernels, and dependency data may be tracked between these portions, thereby allowing for balanced workloads across GPUs. In addition, fine grained, region based dependency data may be generated and used between kernels.

At 1030, the method includes checking dependency data generated from one or more portions of the first kernel prior to execution of a portion of a second kernel. In particular, the subsequently executing portion of the second kernel will wait on dependency data to ensure that every region of one or more resources required to be read by the portion of the second kernel has completely been written to by the first kernel. For example, dependency data generated by a portion of a first kernel indicates completion of one or more writes to one or more regions of a resource, or completion of execution of the portion of the first kernel.

In one embodiment, once a region has been written to by a GPU (e.g. executing a portion of a first kernel), the written data is sent to the other GPUs. In embodiments of the present disclosure, once all the regions required by a portion of a second kernel have been written to by the previously executing first kernel (e.g. another portion of the first kernel), execution of the portion of the second kernel may begin without waiting for other portions of the first kernel to complete their copy operations, and without the use of a synchronization point for copying.

In another embodiment, GPUs may prefetch the regions of resources that are needed by the portions of kernels to be executed. The GPU information (i.e. which GPU wrote to the region in the dependency data) may be used to determine which GPU to read the data from. In some cases, the region data may well reside in the local memory of the requesting GPU.

At 1040, the method includes delaying execution of the portion of the second kernel as long as the corresponding dependency data of the first kernel has not been met. That is, the portion of the second kernel checks, using dependency data, to ensure that all regions it requires have been written, after which the portion of the second kernel may begin processing. That is, the dependency data indicates whether a portion of a kernel can access a required region. In particular, dependency data may be used to synchronize later kernel invocations, or execution of a portion of a kernel (e.g. second kernel).

Figure 11A:
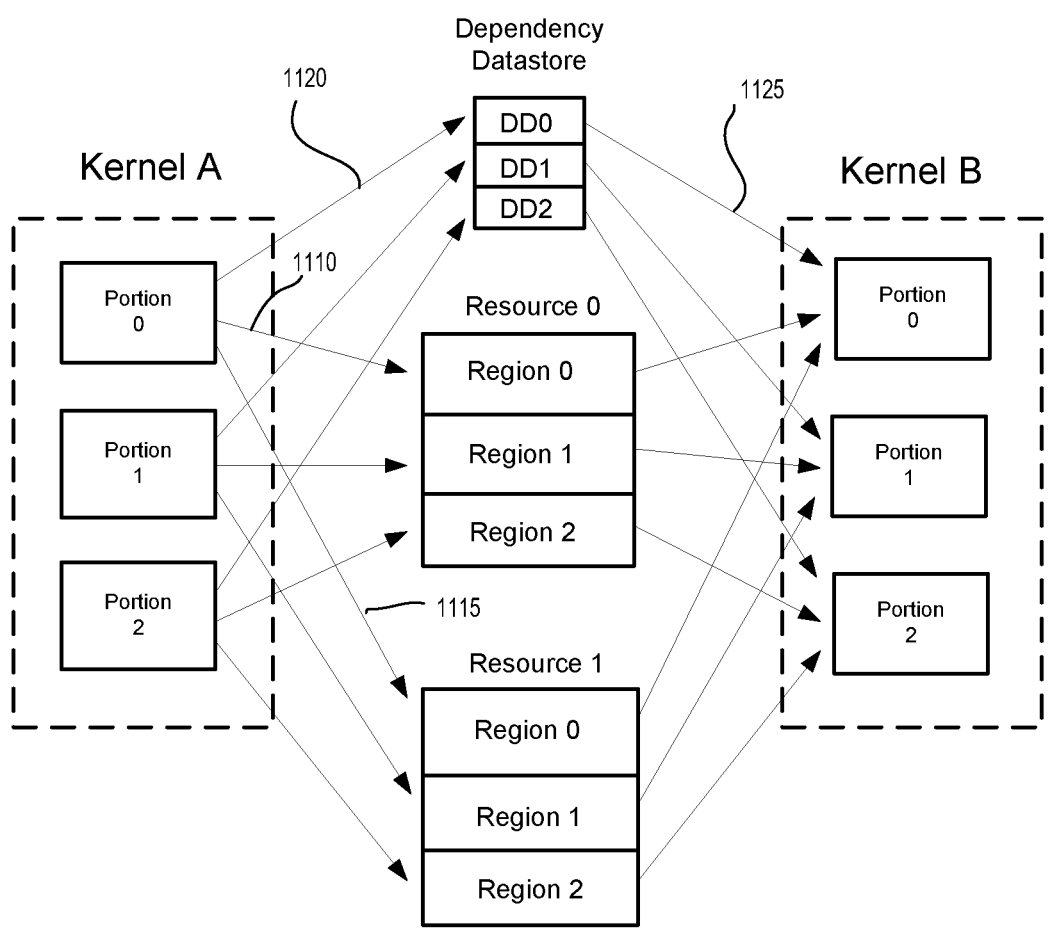
FIG. 11A illustrates dependency data based on a portion of a kernel, in accordance with one embodiment of the disclosure.

FIG. 11A illustrates the generation of dependency data that is based on a portion of a kernel, in accordance with one embodiment of the disclosure. In particular, kernel A and kernel B are each divided into three respective portions—portion 0, portion 1 and portion 2. Resource 0 and resource 1 are each divided into three respective regions—region 0, region 1, and region 2.

In particular, a portion of a kernel may generate dependency data on completion of its processing or on completion of writes to regions of resources. For example, portion 0 of kernel A may generate dependency data that is portion based, such that the dependency data is written only after completion of portion 0 of kernel A or on completion of portion 0 of kernel A writing to region 0 of resource A and resource B. In particular, portion 0 of kernel A writes to region 0 of resource 0 along path 1110, and also writes to region 0 of resource 1 along path 1115. Upon completion of its processing or writes to regions, portion 0 of kernel A also writes dependency data DD0, as indicated by path 1120. In one embodiment, dependency data (e.g. DD0, or DD1, or DD2) can be stored in any array. For example, dependency data may be stored in an index range, wherein each dimension is shifted or divided by an amount and the resulting value is used as an index into the array.

Portion 0 of kernel B is dependent on data from both resource 0 and resource 1 as indicated by dependency data DD0. In particular, portion 0 of kernel B waits on dependency data DD0, and then after DD0 is generated, is able to read region 0 of resource 0, and read region 0 of resource 1. That is, portion 0 of kernel B is able to check the status of dependency data DD0, and is able to access DD0 when it is generated and stored, as indicated by path 1125. Because portion 0 of kernel B can determine that all of its required regions of resources is accessible via the dependency data, that portion can begin execution without waiting for portions of kernel A to complete their processing and copying, and without using a synchronization point (e.g. for copying).

Figure 11B:
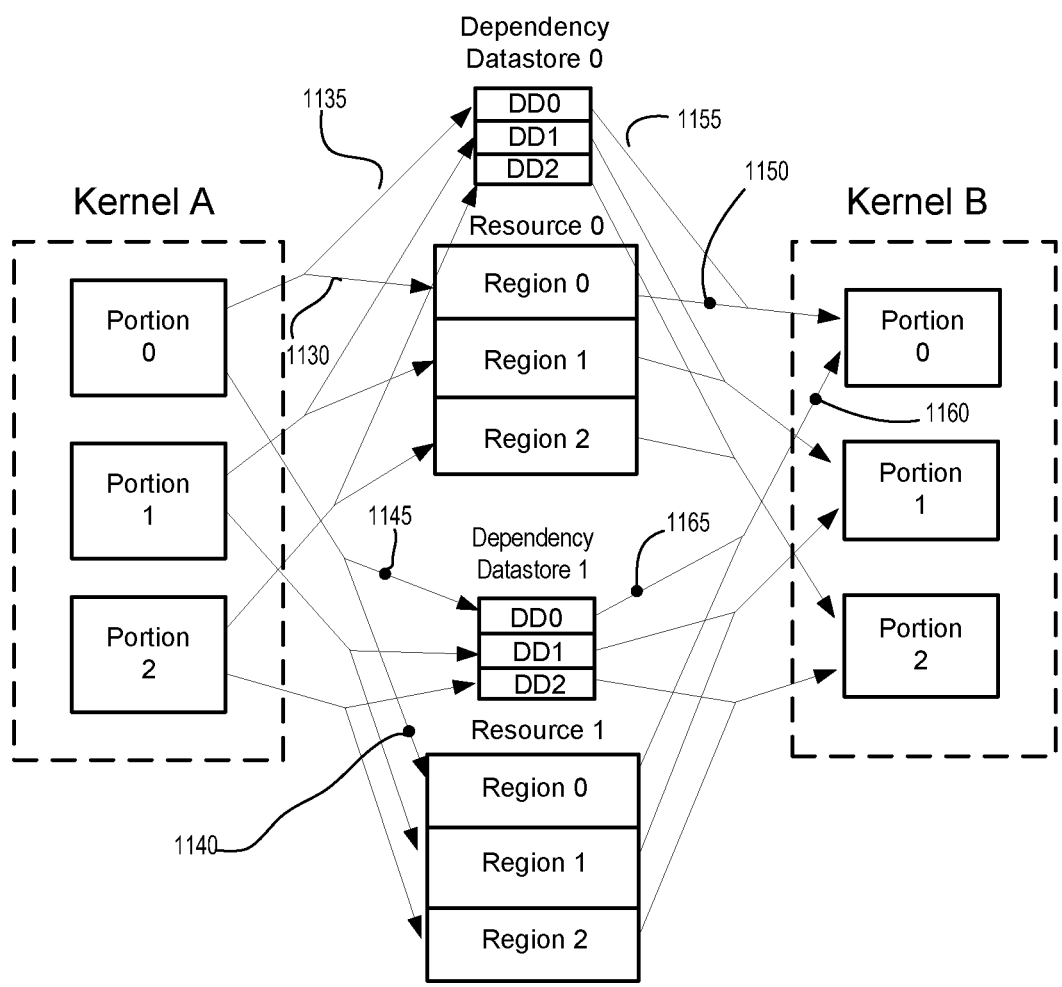
FIG. 11B illustrates dependency data based on regions and portions of a kernel, in accordance with one embodiment of the disclosure.

FIG. 11B illustrates dependency data based on regions of a resource and portions of a kernel, in accordance with one embodiment of the disclosure. In particular, kernel A and kernel B are each divided into three respective portions—portion 0, portion 1 and portion 2. Resource 0 and resource 1 are each divided into three respective regions—region 0, region 1, and region 2.

Dependency data is generated per portion and per region of a resource. In particular, a portion of a kernel may generate dependency data upon completion of all writes to a resource (e.g. a region of a resource). For example, portion 0 of kernel A writes to region 0 of resource 0 along path 1130. Upon completion of all writes to region 0 of resource 0, portion 0 of kernel A may generate dependency data DD0, and store the dependency data DD0 in dependency datastore 0 (e.g. array) along path 1135. In addition, portion 0 of kernel A writes to region 0 of resource 1 along path 1140. Upon completion of all writes to region 0 of resource 1, portion 0 of kernel A may generate dependency data DD0 and store the dependency data DD0 in dependency datastore 1 (e.g. array) along path 1145.

Portion 0 of kernel B is dependent on data from both resource 0 and resource 1. Dependency data generated in FIG. 11B may be more fine grained than the dependency data generated in FIG. 11A, as the dependency data is generated per portion and per region of a resource. In particular, portion 0 of kernel B waits on two sets of dependency data, including dependency data DD0 of dependency datastore 0 and dependency data DD0 of dependency datastore 1.

In particular, portion 0 of kernel B waits on dependency data DD0 of dependency datastore 0, and then after DD0 is generated, is able to read region 0 of resource 0 along path 1150. Portion 0 of kernel B is able to check the status of dependency data DD0 of datastore 0, and is able to access that dependency data DD0 when it is generated and stored, as indicated by path 1155. Also, portion 0 of kernel B waits on dependency data DD0 of dependency datastore 1, and then after DD0 is generated, is able to read region 0 of resource 1 along path 1160. Portion 0 of kernel B is able to check the status of dependency data DD0 of datastore 1, and is able to access that dependency data DD0 when it is generated and stored, as indicated by path 1165.

Because portion 0 of kernel B can determine that all of its required regions of resources is accessible via the dependency data (DD0 of dependency datastore 0 and DD0 of dependency datastore 1), that portion can begin execution without waiting for portions of kernel A to complete their processing and copying, and without using a synchronization point (e.g. for copying).

In another embodiment, region data of a corresponding resource may be pushed to all GPUs (i.e. sent to local memory of all GPUs) once a portion of a kernel has finished writing to the corresponding region. In that case, subsequent kernels that use that region data may wait for the arrival of the data at their local memory. In particular, upon completion of a portion of a first kernel executing on a first GPU, data generated by the first kernel at the first GPU is sent to a local memory of a second GPU.

As previously described, GPUs may prefetch the regions of resources that are needed by the portions of kernels to be executed. That is, region data may be fetched before data is needed. In particular, once a portion of a first kernel executing on a first GPU has finished writing to a region of a resource and generating corresponding dependency data, a portion of a second kernel executing on a second GPU that may be waiting on this dependency data may then read that region. The second GPU (executing the portion of the second kernel) knows which GPU to read memory from, as that information may be part of the dependency data. In some embodiments, efficient prefetching uses a known order of the execution of subsequent portions to determine which regions of resources required by those portions are to be copied.

In one embodiment, the second GPU may read region data directly from the local memory of the first GPU, such as over a lower speed bus depicted in FIG. 2. In another embodiment, the second GPU may copy region data from the local memory of the first GPU into the local memory of the second GPU prior to the execution of the portion of the second kernel. In this case, the portion of the second kernel can then read the region data from its local memory.

In still another embodiment, the second GPU utilizes both of the read and copy methods outlined above to include reading region data directly from local memory of the first GPU, and also copying that region data from corresponding local memory into the local memory of the second GPU. In particular, at commencement of execution of the portion of the second kernel, the second GPU begins to copy region data from the local memory of the first GPU to the local memory of the second GPU. For example, data generated by the first GPU and written to the local memory of the first GPU is accessed by the second GPU prior to completion of a direct memory access (DMA), wherein access is performed directly from the local memory of the first GPU by normal read operations. While copying is proceeding, the second GPU reads region data directly from the local memory of the first GPU. That is, the second GPU may begin early processing of its portion of the second kernel by performing a direct read from local memory of the first GPU. For example, data generated by the first kernel executing on the first GPU and written to the local memory of the first GPU is fetched via DMA into the local memory of the second GPU executing the second kernel. Before the copying completes, the second GPU reads the data directly from the first GPU. After the copying completes, the second GPU then reads region data directly from the local memory of the second GPU. For example, data generated by the first GPU and written to the local memory of the first GPU is accessed by the second GPU after completion of the DMA from the local memory of the second GPU. In that manner, only the regions that are needed to execute the portion of the second kernel are read, thereby reducing bandwidth across the multi-GPU architecture.

In another embodiment, if the execution order of portions of the second kernel are known, then the second GPU can use this order to predict which portions of the second kernel will likely be executed next. In that manner, the second GPU can pre-fetch the corresponding regions of one or more resources that the portion of the second kernel will use as input prior to execution. That is, based on the predefined or predicted order of the second kernel at the second GPU, data generated by the first kernel executing on a first GPU may be prefetched into the local memory of the second GPU. This assumes that the dependency data for those regions have been generated indicating that those regions have been written. If the region data already exists in the local memory of the GPU executing kernel portions, then this order can also be used to prefetch from local memory into faster local cache memory, further increasing bandwidth and/or reducing latency.

When a portion of a kernel checks corresponding dependency data, that portion may use various strategies that reference the index ranges associated with itself (e.g. in a corresponding index space associated with a kernel invocation) and with the portion of the kernel that generated the dependency data, in embodiments. For example, FIGS. 12A-12D representatively illustrate the checking of dependency data by a portion of a kernel that is some function of an index range of that portion, in accordance with embodiments of the disclosure. It is understood that any function may be used for checking of dependency data.

For purposes of clarity and brevity, each of FIGS. 12A-12D shows each portion of a kernel having an index range of unit size. Also, in each of FIGS. 12A-12D kernel A (not shown) writes to regions of resource A, and generates and stores associated dependency data. Portion A having index range (2,2) or (1,1) of kernel B reads resource A and writes to resource B. Four different strategies for checking dependency data are shown in FIGS. 12A-12D by which portion A of kernel B can check dependency data.

In particular, one or more portions of a first kernel (e.g. kernel A) for which dependency data is checked prior to execution of a portion of the second kernel (e.g. kernel B) depends on the index range for each dimension that comprises the portion of the second kernel (e.g. kernel B). In one embodiment, dependency data related to the portion of the first kernel (e.g. kernel A) is checked, wherein the portion includes an index range for each dimension that corresponds to those of the second kernel (e.g. kernel B), or an offset thereof. In another embodiment, dependency data related to multiple portions of the first kernel (e.g. kernel A) is checked, wherein the portions include index ranges for each dimension that are, taken together, a superset of the index ranges for each dimension of the second kernel. In still another embodiment, one or more dependency data related to portions of the first kernel (e.g. kernel A) are checked, wherein the one or more portions incudes at least one index range for each dimension that is a function calculated using index ranges of the second kernel (e.g. kernel B).

Figure 12A:
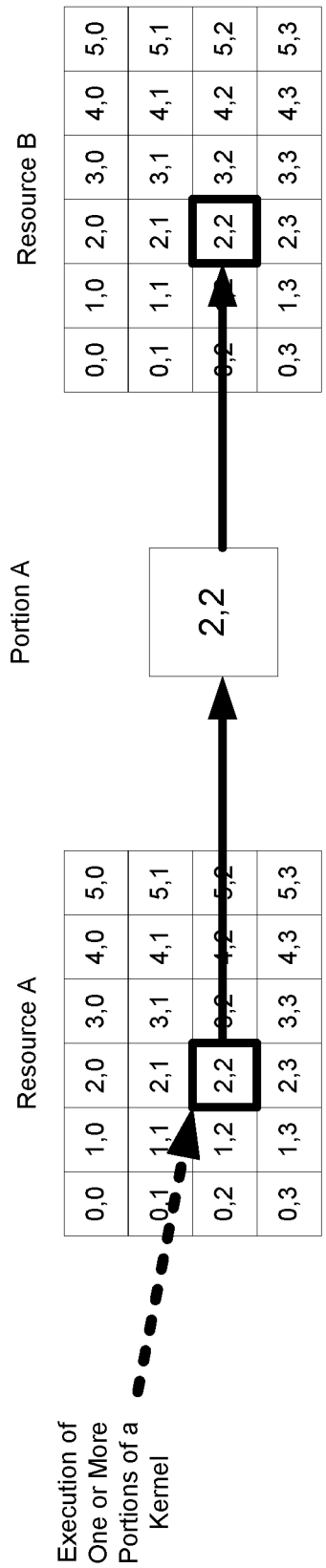

In particular, FIG. 12A illustrates the checking of dependency data by a portion A of a kernel B that corresponds to an index range (e.g. 2,2) of that portion, in accordance with one embodiment of the disclosure. For example, portion A of kernel B is associated with index range (2,2) in a corresponding index space. Also, portion A of kernel B writes to region (2,2) of resource B, as is shown in FIG. 12A. There is a one-to-one transformation between the region read from or written to in resource A by portion A of kernel B, and the region located in resource B to which that same data or some function thereof is written. That is, the region (2,2) of resource B that receives output data is the same as the location as the region (2,2) of resource A from which the data is read. In other words, there is a one-to-one relationship between the region index ((2,2) of resource A) and the portion index ((2,2) of kernel B).

Figure 12B:
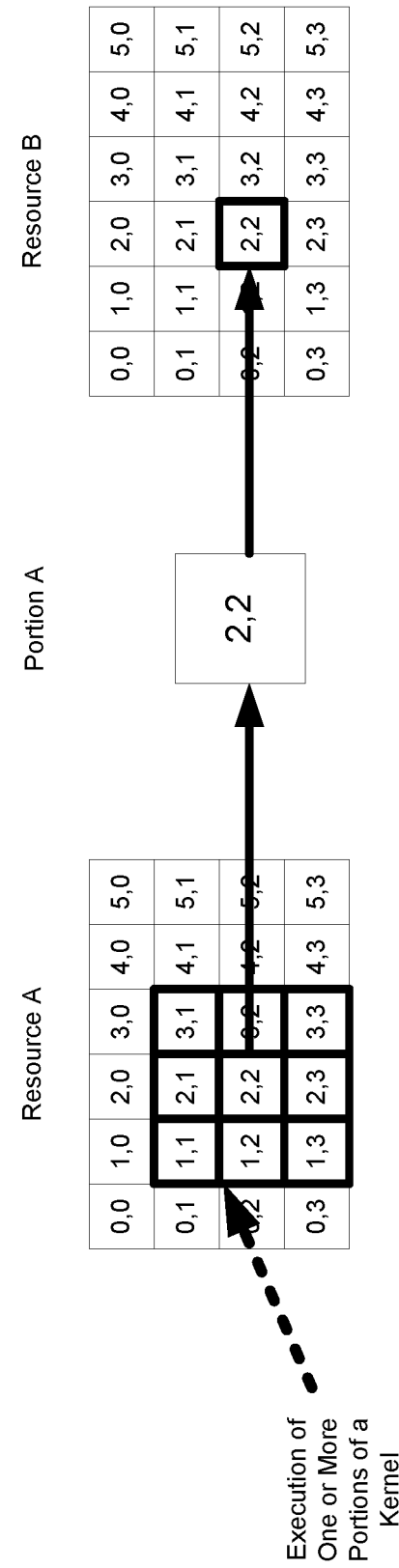

FIG. 12B illustrates the checking of multiple pieces of dependency data by a portion A of kernel B that is associated with an index range, in accordance with one embodiment of the disclosure. In particular, dependency data is checked corresponding to index ranges that are within a radius of one of the index range (2,2) or portion ID of portion A of kernel B. For example, portion A of kernel B may be a filter function where multiple regions surrounding a center pixel (e.g. corresponding to region (2,2) of resource A that is related to the index range of portion A of kernel B) are read and filtered, with an output to region (2,2) of resource B. That is, the filter function defines sampling regions surrounding the index range (e.g. portion ID) of portion A of kernel B. As shown the sampling regions from which data is read includes regions (1,1), (2,1)(3,1), (1,2)(2,2), (3,2)(1,3), (2,3), and (3,3) of resource A. The output being generated from the function is stored into region (2,2) of resource B.

FIG. 12C illustrates the checking of dependency data by a portion A of kernel B that is a function of an index range of that portion, in accordance with one embodiment of the disclosure. In particular, dependency data is checked based on a function of an index range (1,1) or portion ID of portion A of kernel B. In this case, the function is to double the index range (1,1) of portion A, kernel B and take its neighbors in a right and down direction. As shown, the regions that are sampled and read from include regions (2,2), (3,2), (2,3), and (3,3) of resource A. The output being generated from the function is stored into region (1,1) of resource B. That is, the function represents a down sampling operation.

FIG. 12D illustrates the checking of dependency data by a portion A of a kernel B that is a function of an index range of that portion, wherein the function is an offset of the index range of that portion, in accordance with one embodiment of the disclosure. In particular, dependency data is checked based on a function of an index range (2,2) or portion ID of portion A of kernel B. In this case, the function is to offset the index range (2,2) of portion A, kernel B in the upward direction. As shown, the region that is sampled and read from is region (2,1) of resource A. The output being generated from the function is stored into region (2,2) of resource B.

Using a function of the portion of the kernel's index range may result in indices that are outside of the defined index space. In these cases, a further action may be performed. In particular, FIGS. 13A-C illustrate various strategies for addressing when a function of the index range of a portion of a kernel is outside of a defined index space, in accordance with embodiments of the disclosure.

Figure 13A:
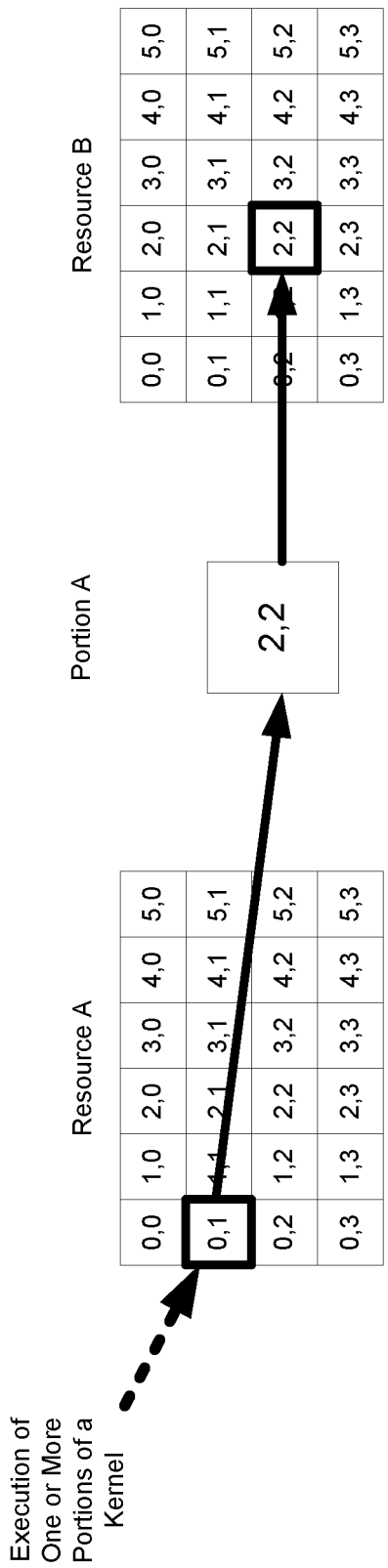
Figure 13B:
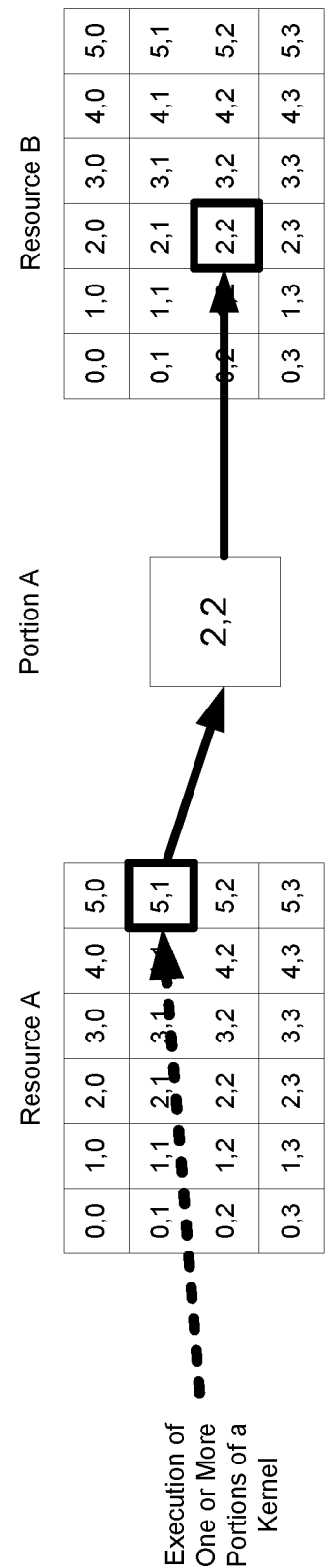

For purposes of clarity and brevity, each of FIGS. 13A-13C shows each portion of a kernel having an index range of unit size (e.g. a "unit" index range). Also, in each of FIGS. 13A-13C kernel A writes to regions of resource A, and generates and stores associated dependency data. Portion A having index range (2,2) of kernel B reads resource A and writes to resource B. Different strategies for an index range for the portion of the first kernel is outside of its index space are presented in FIGS. 13A-13C. Specifically, an offset of (−3,−1) is applied to the unit index range (2,2), which results in a unit index range of (−1,1) (also shown in FIG. 13C), which is outside the index space in a first dimension (e.g., the horizontal or X-direction).

FIG. 13A illustrates the clamping of one dimension of an index range when an offset (e.g., function) applied to an index range of a portion A of a kernel B falls outside of the defined index space, in accordance with one embodiment of the disclosure. The offset is transformed to a corresponding region of similar dimension in resource A. In particular, if the offset index range, superset index range, or calculated index range for the portion of the kernel A is outside of the index space, then the dependency data generated by the kernel A is checked for a portion of the kernel A corresponding to an index range that is clamped in the dimension that is outside of the index space to a valid range, wherein the clamping ensures that the resulting index range (0,1) is inside the index space. For example, the index range is clamped in the horizontal or X-direction to its first value of 0, such that the dependency data is checked for region (0,1) of resource A.

FIG. 13B illustrates the wrapping in one dimension of an index range when an offset (e.g., function) applied to an index range of a portion of kernel B falls outside of the defined index space, in accordance with one embodiment of the disclosure. The offset is transformed to a corresponding region of similar dimension in resource A. In particular, if the offset index range, superset index range, or calculated index range for the portion of the kernel A is outside of the index space, then the dependency data generated by the kernel A is checked for a portion of kernel A corresponding to an index range that is wrapped in the dimension that is outside of the index space to a valid range. In particular, the index range is wrapped to (5,1), wherein the wrapping ensures that the resulting index range (5,1) is inside the index space. In one embodiment, the value is chosen as the unsigned modulo of the index with the size of the index space in that direction. Other methods are suitable when performing wrapping. For example, the index range is wrapped in the horizontal or X-direction to its maximum value of 5, such that the dependency data is checked for region (5,1) of resource A.

FIG. 13C illustrates the ignoring of dependency data when an offset (e.g., function) applied to an index range of a portion of a kernel that falls outside of the defined index space, in accordance with one embodiment of the disclosure. In particular, the dependency data generated by kernel A is ignored. In that manner, the portion of kernel B may decide not to wait on the dependency data, or decide not to execute that portion of kernel B, or to handle it in some other manner.

In some embodiments, the functions performed for reading an index range for dependency data and the actions performed if the results are outside of the defined index space may be different for each resource and for each kernel. That is, the functions may be based on the relevant resource and kernel.

Figure 14A:
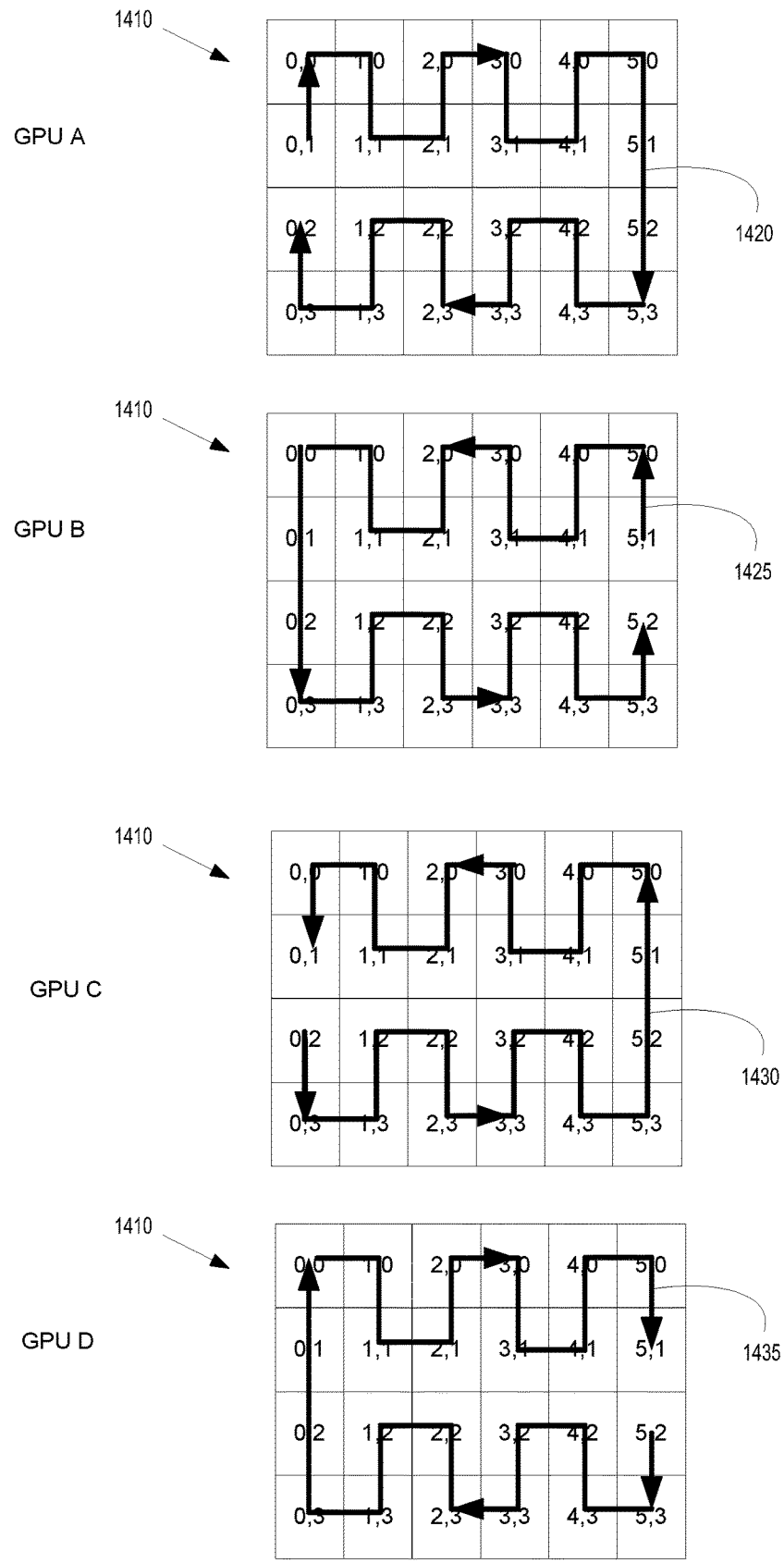
FIG. 14A illustrates a dynamic allocation scheme where different GPUs follow different space filling curves when allocating portions of a kernel to GPUs for execution, in accordance with one embodiment of the disclosure.

FIG. 14A illustrates a dynamic allocation scheme where different GPUs follow different space filling curves when allocating portions of a kernel to multiple GPUs for execution, in accordance with one embodiment of the disclosure. In particular, portions of a kernel are dynamically allocated to the GPUs, wherein a single GPU is granted allocation for a unique portion of a kernel, such that every portion is allocated to one corresponding GPU for execution. As shown, the two-dimensional index space 1410 of a kernel may include twenty-four indices.

A dynamic allocation scheme may be used where portions of kernels are allocated to GPUs as the GPUs become capable of executing them (e.g. available for execution). Responsibility for executing each portion of a kernel is assigned to one and only one GPU, and portions of the kernel are assigned to the GPUs dynamically as the kernel is being executed. That is, assignment of portions of a kernel may reference a predefined order (e.g. space filling curve) that may be different for each GPU. FIG. 14A is representative of one or more predefined orders or space filling curves, but it is understood that other orders may be more efficient for other access patterns. In particular, the order may be different for each GPU, in order to achieve locality of portions assigned to each GPU. As an advantage, even when using a different order per GPU, using the same order for multiple kernels (e.g. in succession) on the same GPU reduces the need for fetching data from other local memories of other GPUs, as the data may reside in that GPU because of locality of portions. As shown in FIG. 14A, portions of the kernel are attempted to be allocated to a corresponding GPUs using a known predefined order for each GPU.

FIG. 14A shows multiple orderings or space filling curves, each corresponding to a GPU. For example, GPU A follows space filling curve 1420 that begins at index range (0,1) of the index space 1410, checks index ranges in an approximately clockwise fashion, and ends at index range (0,2). For illustration, space filling curve 1420 tries to allocate portions of the kernel in the following order: (0,1), then (0,0), then (1,0), then (1,1), then (2,1), etc. Also, GPU B follows space filling curve 1425 that begins at index range (5,1) of the index space 1410, checks index ranges in an approximately counter-clockwise fashion, and ends at index range (5,2). For illustration, space filling curve 1425 tries to allocate portions of the kernel in the following order: (5,1), then (5,0), then (4,0), then (4,1), then (3,1), etc. Further, GPU C follows space filling curve 1430 that begins at index range (0,2) of the index space 1410, checks index ranges in an approximately counter-clockwise fashion, and ends at index range (0,1). For illustration, space filling curve 1430 tries to allocate portions of the kernel in the following order: (0,2), then (0,3), then (1,3), then (1,2), then (2,2), etc.

Also, GPU D follows space filling curve 1435 that begins at index range (5,2) of the index space 1410, checks index ranges in an approximately clockwise fashion, and ends at index range (5,1). For illustration, space filling curve 1435 tries to allocate portions of the kernel in the following order: (5,2), then (5,3), then (4,3), then (4,2), then (3,2), etc.

In one embodiment, one or more space filling curves optimized for portion locality per GPU will reduce the need for fetching data from the local memory of other GPUs, when a portion of a kernel uses as input in successive passes multiple regions that are spatially close together in a buffer resource, or image resource. In particular, a predefined order that is referenced by a corresponding GPU when allocating portions of a kernel may be a space filling curve defined within the dimensions of the kernel or corresponding kernel invocation.

In one embodiment, progress along a corresponding allocation order (e.g. distance from start for a space filling curve) can be shared amongst multiple GPUs. This progress provides an efficient way to check which portions of the kernel have already been attempted to allocate to each GPU so that a GPU need not try to allocate a portion that has already been allocated.

FIG. 14B illustrates the allocation of portions of a kernel following the order of allocation outlined in the GPU space filling curves defined in FIG. 14A (e.g., curve 1420 for GPU A, curve 1425 for GPU B, curve 1430 for GPU C, and curve 1435 for GPU D), in accordance with one embodiment of the disclosure. Each GPU allocates portions simultaneously, such as in steps. Because the space filling curves start at different index ranges, each GPU is initially allocated a portion of the corresponding kernel for execution. For example, in step 1, GPU A is allocated portion (0,1) of the index space 1410, GPU B is allocated portion (5,1), GPU C is allocated portion (0,2), and GPU D is allocated portion (5,2).

As some portions may take longer to complete than others (e.g., depending on the input values, etc.), some GPUs end up with more portions being allocated from the index space 1410. For example, GPU C continues to execute portion (0,2) over steps 1 through 3, and is not allocated any additional portions in step 2 or step 3, whereas each of GPU A, GPU B, and GPU D are being allocated additional portions in each of step 2 and step 3.

In some cases, a GPU is able to allocate more than one portion. For example, in step 4, GPU A is able to allocate three additional portions, including portions (1,1), (2,1), and (2,0). Also, in step 4 GPU B is able to allocate two additional portions, including portions (4,1) and (3,1).

As shown in FIG. 14B, each of the GPUs are allocated portions by locality, such that portions are localized to each other. In some cases, a GPU may not be able to allocate following a desire for localization. For example, in step 5, GPU B attempts to allocate both portions (3,0), (2,0), (2,1) . . . , however each of these portions have already been allocated by GPU A and/or GPU C. The first portion available to GPU B that has not already been allocated following space filling curve 1425 is portion (1,2). That is, GPU B allocates the next portion along its predefined order or space filling curve 1425 that has not already been allocated to a GPU.

Figure 15:
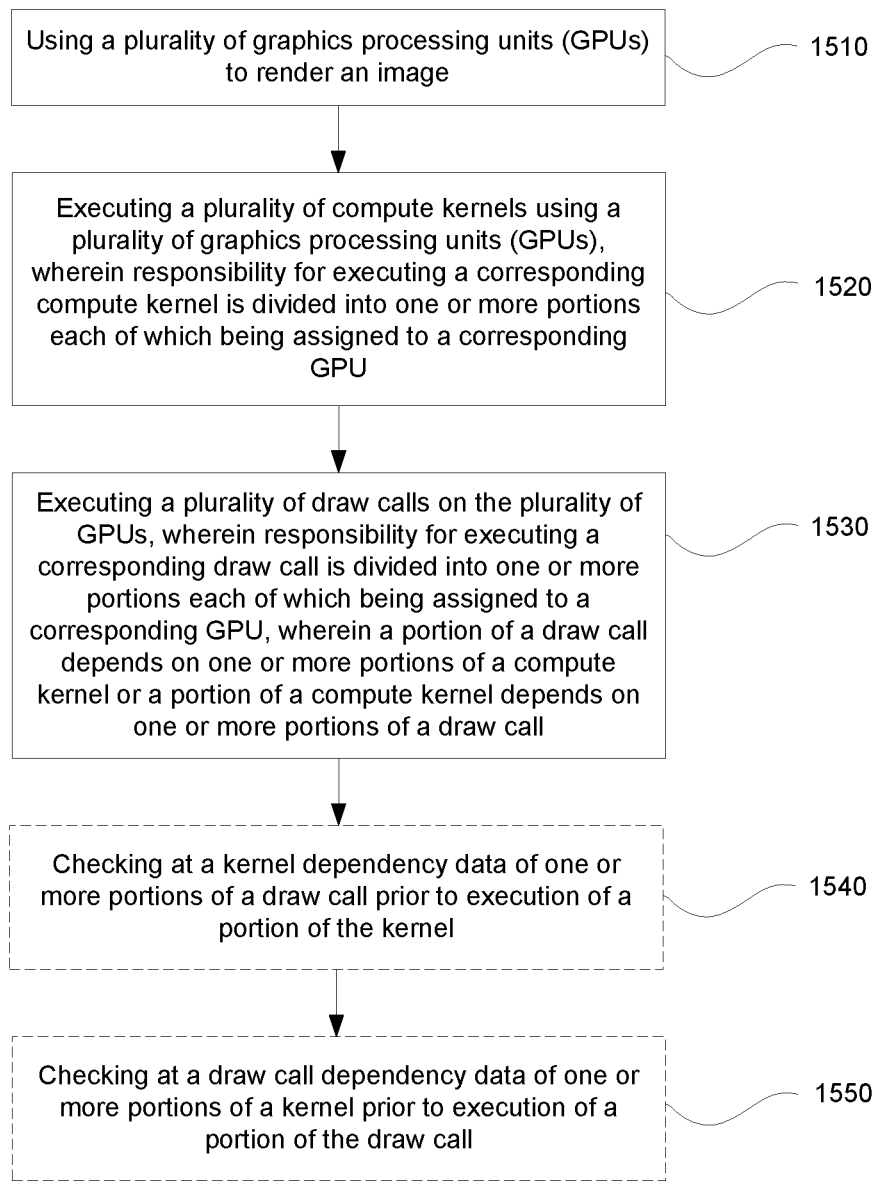
FIG. 15 is a flow diagram illustrating steps in a method for graphics processing including multi-GPU rendering of an image for an application, wherein dependency data may be based on kernel processing and/or draw call execution, in accordance with one embodiment of the disclosure.

With the detailed description of multi-GPU architectures and their implementations previously described in FIGS. 1-14, flow diagram 1500 of FIG. 15 illustrates a method for graphics processing including multi-GPU rendering of an image for an application, wherein dependency data may be based on kernel processing and/or draw call execution, wherein a number of GPUs collaborate to process an image or data, in accordance with one embodiment of the disclosure. As previously described, various architectures may include multiple GPUs collaborating to process an image or data, such as within one or more cloud gaming servers of a cloud gaming system, or within a stand-alone system, such as a personal computer or gaming console that includes a high-end graphics card having multiple GPUs, etc. The GPUs execute simultaneously. In embodiments, multiple GPUs may share one or more command buffers, or each GPU may have one or more dedicated command buffers. A command buffer can contain kernel invocation commands, as well as other commands, such as draw call commands, or a combination of both kernel invocation commands and draw call commands.

At 1510, the method includes using a plurality of graphics processing units (GPUs) to render an image. For example, graphics may be rendered for an application using a plurality of GPUs that collaborate to generate an image and/or data. Multi-GPU processing is performed when rendering a single image and/or each of one or more images of a sequence of images for a real-time application.

At 1520, the method includes executing a plurality of kernels on the plurality of GPUs. Responsibility for executing a corresponding kernel is divided into one or more portions, wherein each portion is assigned to a corresponding GPU.

At 1530, the method includes executing a plurality of draw calls on the plurality of GPUs. Responsibility for executing a corresponding draw call is divided into one or more portions, wherein each portion is assigned to a corresponding GPU. In particular, when rendering an image via draw commands, a corresponding draw command may be divided into portions (in a manner analogous to the invocation of a kernel being divided into portions), wherein each portion is allocated to a GPU, such that each portion is allocated to only one GPU. As such, each GPU renders portions of the draw call that have been allocated to the same GPU. In addition, each portion of a draw call may generate dependency data (e.g. generate dependency data on completion of portion of draw call).

In one embodiment, there may be dependency checking between portions of draw calls and/or portions of kernels. That is, a portion of a draw call depends on one or more portions of a kernel, or a portion of a kernel depends on one or more portions of a draw call. Dependency data may be generated by a portion of a kernel, or a may be generated by a portion of a draw call.

At 1540, the method (optionally) includes checking at a kernel dependency data of one or more portions of a draw call prior to execution of a portion of the kernel. In particular, portions of kernels may check dependency data generated by portions of draw calls, and take appropriate action, e.g. suspend execution of the corresponding portion of the kernel until the portion of the corresponding draw call has completed.

At 1550, the method (optionally) includes checking at a draw call dependency data of one or more portions of a kernel prior to execution of a portion of the draw call. In particular, each portion of a draw call may check dependency data (e.g. not process until dependency is met), and/or generate dependency data (e.g. generate dependency data on completion of portion of draw call). In one embodiment, portions of draw calls may check dependency data generated by portions of kernels, and take appropriate action, e.g. suspend execution of the corresponding portion of the draw command until the portion of corresponding kernel has completed.

Figure 16:
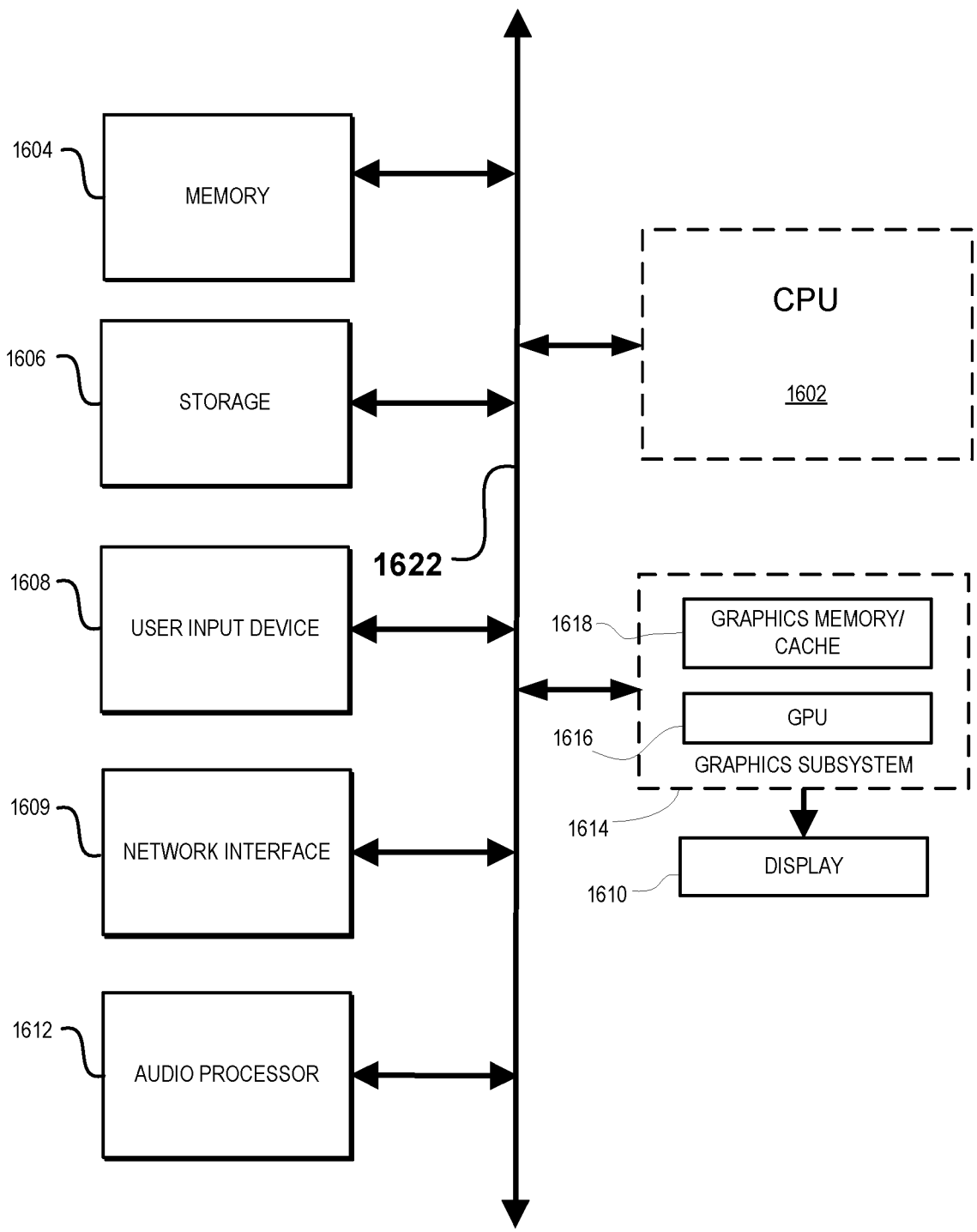
FIG. 16 illustrates components of an example device that can be used to perform aspects of the various embodiments of the present disclosure.

FIG. 16 illustrates components of an example device 1600 that can be used to perform aspects of the various embodiments of the present disclosure. For example, FIG. 16 illustrates an exemplary hardware system suitable for executing kernels, wherein a number of graphics processing units (GPUs) collaborate to process an image or data, in accordance with embodiments of the present disclosure. This block diagram illustrates a device 1600 that can incorporate or can be a personal computer, a server computer, gaming console, mobile device, or other digital device, each of which is suitable for practicing an embodiment of the invention. Device 1600 includes a central processing unit (CPU) 1602 for running software applications and optionally an operating system. CPU 1602 may be comprised of one or more homogeneous or heterogeneous processing cores.

In accordance with various embodiments, CPU 1602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1604 stores applications and data for use by the CPU 1602 and GPU 1616. Storage 1606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1608 communicate user inputs from one or more users to device 1600, examples of which may include keyboards, mice, joysticks, touch pads, touch screens, still or video recorders/cameras, and/or microphones. Network interface 1609 allows device 1600 to communicate with other computer systems via an electronic communications network, and may include wired or wireless communication over local area networks and wide area networks such as the internet. An audio processor 1612 is adapted to generate analog or digital audio output from instructions and/or data provided by the CPU 1602, memory 1604, and/or storage 1606. The components of device 1600, including CPU 1602, graphics subsystem including GPU 1616, memory 1604, data storage 1606, user input devices 1608, network interface 1609, and audio processor 1612 are connected via one or more data buses 1622.

A graphics subsystem 1614 is further connected with data bus 1622 and the components of the device 1600. The graphics subsystem 1614 includes at least one graphics processing unit (GPU) 1616 and graphics memory 1618. Graphics memory 1618 includes a display memory (e.g. a frame buffer) used for storing pixel data for each pixel of an output image. Graphics memory 1618 can be integrated in the same device as GPU 1616, connected as a separate device with GPU 1616, and/or implemented within memory 1604. Pixel data can be provided to graphics memory 1618 directly from the CPU 1602. Alternatively, CPU 1602 provides the GPU 1616 with data and/or instructions defining the desired output images, from which the GPU 1616 generates the pixel data of one or more output images. The data and/or instructions defining the desired output images can be stored in memory 1604 and/or graphics memory 1618. In an embodiment, the GPU 1616 includes 3D rendering capabilities for generating pixel data for output images from instructions and data defining the geometry, lighting, shading, texturing, motion, and/or camera parameters for a scene. The GPU 1616 can further include one or more programmable execution units capable of executing shader programs.

The graphics subsystem 1614 periodically outputs pixel data for an image from graphics memory 1618 to be displayed on display device 1610, or to be projected by a projection system (not shown). Display device 1610 can be any device capable of displaying visual information in response to a signal from the device 1600, including CRT, LCD, plasma, and OLED displays. Device 1600 can provide the display device 1610 with an analog or digital signal, for example.

Other embodiments for optimizing the graphics subsystem 1614 could include processing a kernel using multiple GPUs, with dependency tracking per kernel portion to allow for early processing of dependent portions of subsequent kernels, wherein a number of GPUs collaborate to process an image or data. The graphics subsystem 1614 could be configured as one or more processing devices.

For example, the graphics subsystem 1614 may be configured to perform multi-GPU rendering of geometry for an application by region testing while rendering, wherein multiple graphics subsystems could be implementing graphics and/or rendering pipelines for a single application, in one embodiment. That is, the graphics subsystem 1614 includes multiple GPUs used for rendering an image or each of one or more images of a sequence of images when executing an application.

In other embodiments, the graphics subsystem 1614 includes multiple GPU devices, which are combined to perform graphics processing for a single application that is executing on a corresponding CPU. For example, the multiple GPUs can perform multi-GPU rendering of geometry for an application by region testing while rendering of objects for an image. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for multi-GPU rendering of geometry for an application by region testing while rendering of objects for an image or each of one or more images in a sequence of images when executing an application.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
   dividing a first kernel into a plurality of portions during execution of an application;
   assigning a first portion of the first kernel to a first graphics processing unit (GPU) for processing;
   assigning a second portion of the first kernel to a second GPU for processing;

executing to completion the first portion of the first kernel by the first GPU;
storing first data from the executing to completion the first portion of the first kernel on a first storage resource;
generating dependency data after the storing the first data on the first storage resource; and
executing a second kernel after determining that the dependency data has been generated,
wherein the executing the second kernel begins before the second portion of the first kernel has completed processing by the second GPU.

2. The method of claim 1, further comprising:
storing second data from executing the second portion of the first kernel on a second storage resource,
wherein the executing the second kernel begins before the storing the second data is completed.

3. The method of claim 1,
wherein the dependency data is based on a corresponding portion of a corresponding kernel and a corresponding region of a corresponding storage resource.

4. The method of claim 1,
wherein the dependency data is generated per region of the first storage resource and per portion of the plurality of portions of the first kernel.

5. The method of claim 1, further comprising:
storing the dependency data in a second storage resource; and
checking the second storage resource to determine if the dependency data has been generated before the executing the second kernel.

6. The method of claim 1, further comprising:
sending the first data to local memory of a third GPU tasked to execute the second kernel; or
fetching, via direct memory access (DMA), the first data to the local memory of the third GPU.

7. The method of claim 1, further comprising:
assigning the plurality of portions of the first kernel to a plurality of GPUs on a one-to-one basis as the first kernel is being executed by the first GPU.

8. A non-transitory computer-readable medium storing a computer program for execution by a processor to perform a method, the non-transitory computer-readable medium comprising:
program instructions for dividing a first kernel into a plurality of portions during execution of an application;
program instructions for assigning a first portion of the first kernel to a first graphics processing unit (GPU) for processing;
program instructions for assigning a second portion of the first kernel to a second GPU for processing;
program instructions for executing to completion the first portion of the first kernel by the first GPU;
program instructions for storing first data from the executing to completion the first portion of the first kernel on a first storage resource;
program instructions for generating dependency data after the storing the first data on the first storage resource; and
program instructions for executing a second kernel after determining that the dependency data has been generated,
wherein the executing the second kernel begins before the second portion of the first kernel has completed processing by the second GPU.

9. The non-transitory computer-readable medium of claim 8, further comprising:
program instructions for storing second data from executing the second portion of the first kernel on a second storage resource,
wherein the executing the second kernel begins before the storing the second data is completed.

10. The non-transitory computer-readable medium of claim 8,
wherein, in the method, the dependency data is based on a corresponding portion of a corresponding kernel and a corresponding region of a corresponding storage resource.

11. The non-transitory computer-readable medium of claim 8,
wherein, in the method, the dependency data is generated per region of the first storage resource and per portion of the plurality of portions of the first kernel.

12. The non-transitory computer-readable medium of claim 8, further comprising:
program instructions for storing the dependency data in a second storage resource; and
program instructions for checking the second storage resource to determine if the dependency data has been generated before the executing the second kernel.

13. The non-transitory computer-readable medium of claim 8, further comprising:
program instructions for sending the first data to local memory of a third GPU tasked to execute the second kernel; or
program instructions for fetching, via direct memory access (DMA), the first data to the local memory of the third GPU.

14. The non-transitory computer-readable medium of claim 8, further comprising:
program instructions for assigning the plurality of portions of the first kernel to a plurality of GPUs on a one-to-one basis as the first kernel is being executed by the first GPU.

15. A computer system comprising:
a processor;
memory coupled to the processor and having stored therein instructions that, if executed by the computer system, cause the computer system to execute a method, comprising:
dividing a first kernel into a plurality of portions during execution of an application;
assigning a first portion of the first kernel to a first graphics processing unit (GPU) for processing;
assigning a second portion of the first kernel to a second GPU for processing;
executing to completion the first portion of the first kernel by the first GPU;
storing first data from the executing to completion the first portion of the first kernel on a first storage resource;
generating dependency data after the storing the first data on the first storage resource; and
executing a second kernel after determining that the dependency data has been generated,
wherein the executing the second kernel begins before the second portion of the first kernel has completed processing by the second GPU.

16. The computer system of claim 15, the method further comprising:
storing second data from executing the second portion of the first kernel on a second storage resource,
wherein the executing the second kernel begins before the storing the second data is completed.

17. The computer system of claim 15,
wherein, in the method, the dependency data is based on a corresponding portion of a corresponding kernel and a corresponding region of a corresponding storage resource.

18. The computer system of claim 15,
wherein, in the method, the dependency data is generated per region of the first storage resource and per portion of the plurality of portions of the first kernel.

19. The computer system of claim 15, the method further comprising:
storing the dependency data in a second storage resource; and
checking the second storage resource to determine if the dependency data has been generated before the executing the second kernel.

20. The computer system of claim 15, the method further comprising:
sending the first data to local memory of a third GPU tasked to execute the second kernel; or
fetching, via direct memory access (DMA), the first data to the local memory of the third GPU.

* * * * *